(12) United States Patent
Asahina

(10) Patent No.: US 9,735,830 B2
(45) Date of Patent: *Aug. 15, 2017

(54) TRANSMISSION SIGNAL GENERATING/DETECTING METHOD USING CODE SEQUENCES, COMMUNICATION SYSTEM USING THE SAME AND MEASUREMENT SYSTEM USING THE SAME

(71) Applicant: Nippon Techno-Resources, Inc., Tokyo (JP)

(72) Inventor: Tadashi Asahina, Saitama (JP)

(73) Assignee: Nippon Techno-Resources, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,090

(22) Filed: Oct. 5, 2016

(65) Prior Publication Data

US 2017/0054471 A1 Feb. 23, 2017

Related U.S. Application Data

(63) Continuation of application No. 14/051,586, filed on Oct. 11, 2013, now Pat. No. 9,467,201, which is a (Continued)

(30) Foreign Application Priority Data

Apr. 11, 2011 (JP) ................. 2011-086939

(51) Int. Cl.
  *H04L 5/00* (2006.01)
  *H04B 1/707* (2011.01)
  (Continued)

(52) U.S. Cl.
  CPC .............. *H04B 1/707* (2013.01); *H04J 13/00* (2013.01); *H04J 13/0077* (2013.01);
  (Continued)

(58) Field of Classification Search
  CPC ........ H04J 13/0077; H04J 13/16; H04J 13/00; H04L 5/0016; H04L 27/2642; H04B 1/707
  (Continued)

(56) References Cited

U.S. PATENT DOCUMENTS 5,960,028 A * 9/1999 Okamoto ............... H04B 1/707
                                                     375/130
7,095,778 B2 * 8/2006 Okubo ................ H04J 13/0022
                                                     375/130
(Continued)

FOREIGN PATENT DOCUMENTS

CN       101164267 A      4/2008
EP       1489775 A1       12/2004
(Continued)

OTHER PUBLICATIONS

Enge, P. K., et al.; "Spread-Spectrum Multiple-Access Performance of Orthogonal Codes: Linear Receiver;" IEEE Trans. Commun., vol. COM-35, No. 12; pp. 1309-1319; dated Dec. 1967.*
(Continued)

*Primary Examiner* — Daniel Washburn
*Assistant Examiner* — Berhanu Tadese
(74) *Attorney, Agent, or Firm* — Alston & Bird LLP

(57) ABSTRACT

The present invention provides a transmission method which generates and sends a transmission signal generated from a multiplexing OFDM signal or a multiplexing wavelet-OFDM signal employing a multiplexing-spread chip sequence in which a chip of a code sequence for spread and a code sequence for combination, and a chip of a code
(Continued)

sequence for localization are multiplied and multiplexed, and a receiving method which makes a high SN ratio improvement rate possible by converting the received signal to a frequency domain to acquire the multiplexing-spread chip sequence and by performing de-spreading and localizing processing to detect a localized pulse. According to the data transmission using the data transmission and receiving method, data is mapped into a code sequence, and the receiving side can detect the data as the kind of code sequence, the shift time of a localized pulse and the polarity at a high SN ratio improvement rate.

4 Claims, 21 Drawing Sheets

Related U.S. Application Data continuation-in-part of application No. PCT/JP2012/059943, filed on Apr. 11, 2012.

(51) Int. Cl.
　　　H04J 13/00　　　(2011.01)
　　　H04J 13/16　　　(2011.01)
　　　H04L 27/26　　　(2006.01)

(52) U.S. Cl.
　　　CPC ............ H04J 13/16 (2013.01); H04L 5/0016 (2013.01); H04L 27/2642 (2013.01)

(58) Field of Classification Search
　　　USPC .......................................... 375/142
　　　See application file for complete search history.

(56) References Cited

U.S. PATENT DOCUMENTS

| | | | | |
|---|---|---|---|---|
| 7,305,213 | B2* | 12/2007 | Kasami | H04B 1/707 375/148 |
| 8,279,953 | B2* | 10/2012 | Uesugi | H04L 5/0007 375/260 |
| 9,467,201 | B2* | 10/2016 | Asahina | H04J 13/0077 |
| 2004/0192238 | A1* | 9/2004 | Kasami | H04B 1/707 455/130 |
| 2005/0281317 | A1* | 12/2005 | Oh | H04L 5/023 375/132 |
| 2007/0297491 | A1* | 12/2007 | Kasami | H04B 1/707 375/142 |
| 2008/0279287 | A1* | 11/2008 | Asahina | H04B 1/69 375/242 |
| 2009/0046787 | A1* | 2/2009 | Uesugi | H04L 5/0007 375/260 |
| 2009/0103593 | A1 | 4/2009 | Bergamo | |
| 2010/0239045 | A1 | 9/2010 | Kataoka | |
| 2012/0230369 | A1* | 9/2012 | Zhang | H04B 1/71632 375/130 |
| 2014/0036964 | A1* | 2/2014 | Asahina | H04J 13/0077 375/141 |

FOREIGN PATENT DOCUMENTS

| | | | | |
|---|---|---|---|---|
| EP | 2247018 A1 | 11/2010 | | |
| EP | 2698938 A1 | 2/2014 | | |
| JP | 2003-218835 A | 7/2003 | | |
| JP | 2003-273775 A | 9/2003 | | |
| JP | 2006-270936 A | 10/2006 | | |
| JP | 2008-124835 A | 5/2008 | | |
| JP | 2009-038570 A | 2/2009 | | |
| JP | EP 2247018 A1 * | 11/2010 | ............ | H04J 11/004 |
| JP | WO 2012141227 A1 * | 10/2012 | .......... | H04J 13/0077 |
| JP | EP 2698938 A1 * | 2/2014 | .......... | H04J 13/0077 |
| KR | EP 1489775 A1 * | 12/2004 | .......... | H04L 5/0046 |
| WO | WO-2007/125581 A1 | 11/2007 | | |
| WO | WO 2012141227 A1 * | 10/2012 | .......... | H04J 13/0077 |

OTHER PUBLICATIONS

Marubayashi, G., et al.; "Spectrum Spread Communications and its Applications;" The Institute of Electronics, Information and Communication Engineers; dated May 1998.*

Oizumi, Ryo et al.; "A Performance Comparison of Wavelet-OFDM in Multi-Path Fading Channel"; Institute of Electronics, Information and Communication Engineers; 2005; pp. 482-483.*

Kohno, Ryuji; "Ultra Wideband (UWB) Wireless Technology and Its Contribution in Future Intelligent Wireless Access"; vol. 87, No. 5; 2004; pp. 396-401.*

Enge, P. K., et al.; "*Spread-Spectrum Multiple-Access Performance of Orthogonal Codes: Linear Receiver*;" IEEE Trans. Commun., vol. COM-35, No. 12; pp. 1309-1319; dated Dec. 1967; 12 pages.

Koizumi, Ryo et al.; "A Performance Comparison of Wavelet-OFDM in Multi-Path Fading Channel"; Institute of Electronics, Information and Communication Engineers; 2005; pp. 482-483.

Marubayashi, G., et al.; "*Spectrum Spread Communications and its Applications;*" The Institute of Electronics, Information and Communication Engineers; dated May 1998, 5 pages.

Jinkang, Z., et al.; "A Proposal of Parallel Combination SS Communication System;" The Institute of Electronics, Information and Communication Engineers (B11), J74-B-11, 5; pp. 207-214; dated May 1991.

Yamauchi, Y.; "Spectrum Spread Communications;" Tokyo Denki University Press; dated 1998, 3 pages.

Extended European Search Report for corresponding European Application No. 12770542.4 dated Sep. 23, 2014, 7 pages.

International Preliminary Report on Patentability for Application No. PCT/JP2012/059943; dated Oct. 15, 2013.

International Search Report and Written Opinion for Application No. PCT/JP2012/059943; dated Jun. 19, 2012.

Office Action for Japanese Patent Application No. 2016-138025 dated May 26, 2017 with English translation, 8 pages.

\* cited by examiner

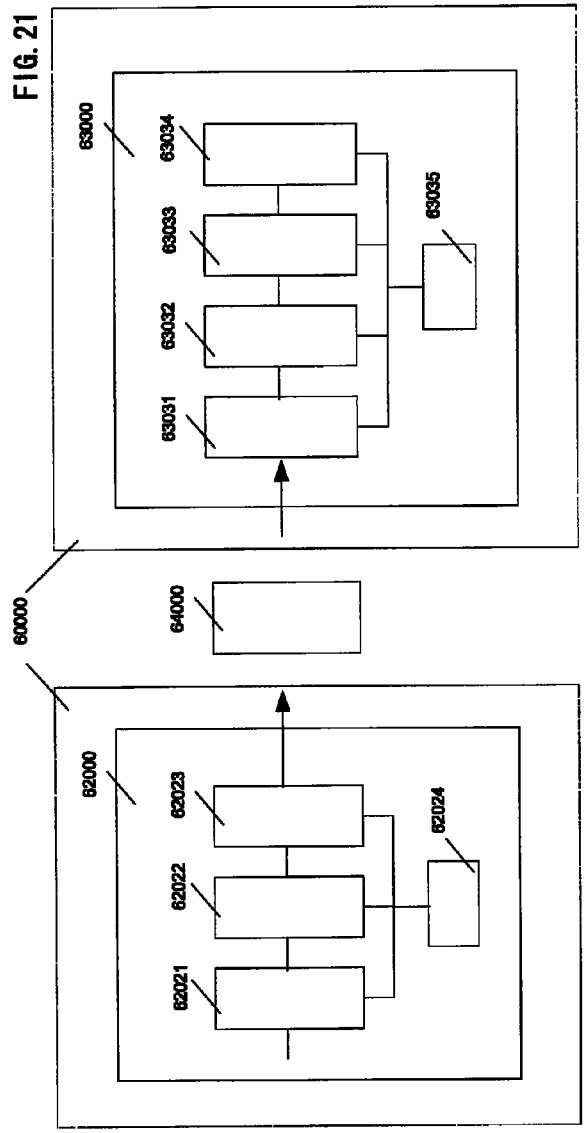

TRANSMISSION SIGNAL GENERATING/DETECTING METHOD USING CODE SEQUENCES, COMMUNICATION SYSTEM USING THE SAME AND MEASUREMENT SYSTEM USING THE SAME

CROSS-REFERENCE TO RELATED APPLICATION

This application is a continuation application of U.S. patent application Ser. No. 14/051,586, which was filed on Oct. 11, 2013, and which is a continuation-in-part application of International Application PCT/JP2012/059943, which was filed on Apr. 11, 2012, and which claims priority from Japanese Patent Application 2011-086939, which was filed on Apr. 11, 2011, the contents of each of which are incorporated by reference herein in their entirety.

FIELD

The present invention relates to a transmission signal generating/detecting method using code sequences, a communication system making use of the generating/detecting method and a measurement system making use of the same method.

BACKGROUND

A communication method enabling high-speed/high-quality communications under existences of strong noises and obstacles is needed for building up smart grids etc. There has hitherto been disclosed a DS-SS (Direct Sequence Spectrum Spread) method as a communication method exhibiting an excellent anti-noise property and enabling multiple access, however, this method, though capable of improving a signal-to-noise ratio (SN ratio) by de-spreading and removing narrowband noises superposed on transmission signals on the way of performing communications outside a bandwidth, has such a problem that the SN ratio about broadband noises cannot be improved (Non-Patent documents 1, 2).

Disclosed further are a transmission apparatus of sequentially transforming input data into parallel data sequences, sequentially allocating the respective parallel data sequences to an N-number of channels ("N" is a natural number equal to or larger than "2"), sequentially transforming the individual parallel data sequences into predetermined orthogonal code sequences, e.g., Walsh function sequences, performing a spectrum spread modulation process by multiplying the orthogonal code sequences by predetermined spread codes respectively, generating an N-number of SS (Spread Spectrum) signals, adding delay values different in magnitude from each other to the respective SS signals, generating transmission multiplexed SS signals in a way that multiplexes the N-number of SS signals by a predetermined method, applying predetermined signal processing to the transmission multiplexed SS signals and thus transmitting these signals, and a reception apparatus of retaining partial spread codes obtained by dividing the spread code by a bit count "J" of the orthogonal code sequence, calculating a partial correlation value between the transmission multiplexed SS signal and each partial spread code, retaining an inverse matrix of an orthogonal code matrix with each orthogonal code sequence being used as a row element, calculating the orthogonal correlation value corresponding to each orthogonal code sequence by multiplying the inverse matrix by a column vector consisting of each partial correlation value, specifying the orthogonal code sequence with the orthogonal correlation value being maximized, making a maximum likelihood determination by outputting the parallel data sequences associated beforehand with the orthogonal code sequences as modulation parallel data sequences to the N-number of channels respectively, correcting a delay difference of the demodulation parallel data sequence of each channel on the basis of a delay quantity added to the SS signal of each channel in the transmission apparatus, sampling each demodulation parallel data sequence after correcting the delay difference on the basis of a regenerative symbol clock synchronizing with a repetitive cycle of the spread code of the transmission multiplexed SS signal, and obtaining series demodulation data sequences by parallel/series-transforming the sampling data of the individual channels (Patent document 4), however, such a problem exists that the orthogonal code sequence like the Walsh function is affected by the noises and gets easy to lose the orthogonality, and there increases a probability of occurrence of erroneous detection in the signals on which the noises are superposed.

Disclosed still further are an M-ary method aiming at fast transmission and a multi-valued M-ary method of representing data with a combination of a plurality of code sequences and with polarities, however, these methods have such problems that an improvement rate of the SN ratio of each method is equal to or smaller than by the DS-SS method, and, in the case of the multi-valued M-ary method, the individual M-ary signal is hard to be detected, and hence it is difficult to obtain a sufficient transmission speed by increasing a multiplicity (Non-Patent documents 1, 3, 4).

Disclosed yet further are a code sequence type transmission apparatus and reception apparatus (Patent documents 1, 2, 3) of generating a transmission signal by use of a multiplexed basic pulse train multiplexed by multiplying a spreading-applied code sequence of a cycle with data being mapped to shift time by an order pulse train consisting of spread code pulses of the cycle, and decoding the data by sequentially de-spreading the detected multiplied basic pulse train with the order pulse train, thus demultiplexing a low-speed code sequence and detecting a localization pulse thereof, however, there are such problems that the spread code sequence of this technology provides just the order, the data is mapped to only the spreading-applied code sequence, an information quantity per chip is therefore small, and a speed-up scheme, though attained by multiplexing the basic pulse train in order to compensate this defect, requires a long period of time for processing and gets circuits complicated, resulting in a rise in cost. Moreover, the SN ratio is improved by de-spreading the multiplexed basic pulse train of the cycle based on the order pulse train and localizing the signal undergoing de-spreading, however, there also exist such problems that de-spreading involves using the basic pulse train on the unit of cycle for the spreading-applied code sequence, a spreading rate cannot be therefore taken sufficiently with the result that the improvement rate of the SN ratio is restricted, and the speed-up scheme is restrained.

The existing technologies described above are different from the present invention in terms of configurations and methods, in which the present invention incorporates generating a multiplexing-spread chip sequence by performing subordinate multiplexing with a multiplicity being equal to or larger than "1" in an amplitude direction by multiplying chips of a spreading-purpose code sequence and chips of a coupling-purpose code sequence together, further multiplying chips of a localizing-purpose code sequence and linearly coupling the chips in a direction of a time base, generating a transform signal by multiplexing an OFDM (Orthogonal Frequency Division Multiplexing) signal with the multiplicity being equal to or larger than "1" that is generated by modulating orthogonal subcarriers with a single multiplexing-spread chip sequence or an aggregation of plural multiplexing-spread chip sequences by a frequency division method different per aggregation, or generating a transmission signal based on the transform signal generated by multiplexing a Wavelet OFDM signal with the multiplicity being equal to or larger than "1" that is generated by modulating an aggregation of Wavelets generated by a parameter setting method determined per aggregation with the aggregation of the multiplexing-spread chip sequences, acquiring and de-spreading the multiplexing-spread chip sequence from the transform signal transformed into a frequency domain on the reception side, and detecting the code sequence for determining each code sequence by combining the detection of the localization pulse in a multiplexing direction on the basis of the code sequence for the combination with the detection of the localization pulse in the direction of the time base on the basis of the localizing-purpose code sequence.

Moreover, the present invention is different from the prior arts in terms of enabling allowance of mapping the data to types of the respective code sequences including the spreading-purpose code sequence, the shift time or/and the polarities in the data transmission.

DOCUMENTS OF PRIOR ARTS

Patent Document

[Patent document 1] Japanese Patent Application Laid-Open Publication No. 2009-38570
[Patent document 2] Japanese Patent Application Laid-Open Publication No. 2008-124835
[Patent document 3] Japanese Patent Application Laid-Open Publication No. 2006-270936
[Patent document 4] Japanese Patent Application Laid-Open Publication No. 2003-218835

Non-Patent Document

[Non-Patent document 1] Gen Marubayashi, et al. "Spectrum Spread Communications and Applications", published by The Institute of Electronics, Information and Communication Engineers
[Non-Patent document 2] Yukiji Yamauchi, "Spectrum Spread Communications", published by Tokyo Denki University Press
[Non-Patent document 3] P. K. Enge & D. V. Sarwate, "Spread-spectrum multiple-access performance of orthogonal codes linear receiver", IEEE Trans.commun., COM-35, 12, p.p. 1300-1319 (December 1967)
[Non-Patent document 4] Zhu Jinkang, et al. "A Proposal of Parallel Combination SS Communication System", published by The Institute of Electronics, Information and Communication Engineers (B11), J74-B-11, 5, p.p. 207-214 (1991-05)

SUMMARY

Problems to be Solved by the Invention

It is an object of the present invention, which was devised in view of the problems described above, to provide a transmission signal generating/detecting method using code sequences, which is capable of generating transmission signals using the code sequences by enabling detection at a high improvement rate of an SN ratio in a way that reduces narrowband and broadband noises containing internal interference noises and external noises, and also capable of detecting the transmission signals at the high improvement rate of the SN ratio.

It is another object of the present invention to provide a communication system which includes a transmission apparatus and a reception apparatus each making use of the transmission signal generating/detecting method, and is capable of attaining a high data carrying rate and performing fast data transmission by setting a multiplicity to a large degree even in noise environments.

It is still another object of the present invention to provide a measurement system using code sequences, which includes a transmission apparatus and a reception apparatus each making use of the transmission signal generating/detecting method, and is capable of making a measurement with a high quality at a high improvement rate of an SN ratio.

Means for Solving the Problems

To accomplish the objects described above by solving the problems inherent in the conventional examples, according to the present invention, a transmission signal generating/detecting method using code sequences includes: generating a multiplexing-spread chip sequence with a multiplicity being equal to or larger than "1" by multiplexing a spread chip sequence formed in a way that multiplies a spreading-purpose code sequence and a chip of a coupling-purpose code sequence with a chip of a localizing-purpose code sequence with respect to the chips of the coupling-purpose code sequence, generating transmission signals on the basis of transform signals generated by transforming at least a single multiplexing-spread chip sequence or a plurality of multiplexing-spread chip sequences and transmitting the generated transmission signals; and acquiring the multiplexing-spread chip sequence in a time domain or a frequency domain from the transform signals by detecting the transmission signals, generating the coupling-purpose code sequence by de-spreading spread chip sequences possessed by the acquired multiplexing-spread chip sequence with the spreading-purpose code sequence of the spread chip sequences, and calculating localization pulses of at least the coupling-purpose code sequence.

The multiplexing-spread chip sequences according to the present invention can be generated in an arbitrary order. According to the present invention, in the transmission signal generating/detecting method, the transform signals are generated by transforming the multiplexing-spread chip sequence so as to be orthogonal at least in the frequency domain and multiplexing the multiplexing-spread chip sequence with the multiplicity being equal to or larger than "1".

According to the present invention, both the communication system and the measuring system are capable of mapping the data independently to the shift time, the amplitude and the polarity of each of the spreading-purpose code sequence, the coupling-purpose code sequence and the localizing-purpose code sequence. If the data are not mapped to any one of or a plurality of the shift time, the amplitude and the polarity, it is deemed that fixed data will have been mapped thereto, however, there is no necessity for executing a process of mapping the fixed data.

According to the present invention, in the case of the measurement also, the data can be mapped to any one of or the plurality of the shift time, the amplitude and the polarity of the code sequence forming the spread chip sequence. In the measuring system in the case of not mapping the data, it is deemed that the fixed data will have been mapped thereto, however, there is no necessity for the data mapping process.

According to the present invention, in the transmission signal generating/detecting method, the transform signals are multiplexed OFDM signals with a multiplicity being equal to or larger than "1" that are obtained by multiplexing OFDM (Orthogonal Frequency Division Multiplexing) signals generated by a frequency division method determined per multiplexing-spread chip sequence, and the multiplexing-spread chip sequence is acquired by transforming the multiplexed OFDM signals into the frequency domain.

According to the present invention, in the transmission signal generating/detecting method, the transform signals are multiplexed Wavelet OFDM signals with a multiplicity being equal to or larger than "1" that are obtained by multiplexing Wavelet OFDM signals generated by parameter settings determined per multiplexing-spread chip sequence, and the multiplexing-spread chip sequence is acquired from a Wavelet coefficient of the multiplexed Wavelet OFDM signals. The Wavelet OFDM signals according to the present invention may be overlapped. Further, the "parameter" represents a scaling coefficient and a shift parameter.

According to the present invention, in the transmission signal generating/detecting method, / the transform signals are multiplexed Wavelet OFDM signals with a multiplicity being equal to or larger than "1" that are obtained by multiplexing Wavelet OFDM signals generated by parameter settings determined per multiplexing-spread chip sequence, and the multiplexing-spread chip sequence is acquired by DFT (Discrete Fourier Transform)—transforming the multiplexed Wavelet OFDM signals into the frequency domain.

According to the present invention, in the transmission signal generating/detecting method, the transform signals are defined as the multiplexing-spread chip sequence, and the transmission signals are generated based on the multiplexing-spread chip sequence.

According to the present invention, in the transmission signal generating/detecting method, the transmission signals are generated by modulating hopping carrier waves with signals for generating the transmission signals including the transform signals, and the multiplexing-spread chip sequence is defined as signals acquired in the frequency domain or in a time domain from the transform signals detected from the transmission signals.

According to the present invention, in the transmission signal generating/detecting method, the transmission signals are modulation signals generated by modulating the carrier waves with the transform signals that are orthogonal in the frequency domain, and the multiplexing-spread chip sequence is acquired in the frequency domain or the time domain from the transform signals detected by demodulating the transmission signals.

According to the present invention, in the transmission signal generating/detecting method, the transmission signals are signals containing at least the transform signals, and the multiplexing-spread chip sequence is acquired in the frequency domain or the time domain from the transform signals of the transmission signals.

According to the present invention, in the transmission signal generating/detecting method, the code sequence includes a sequence to which data is mapped.

According to the present invention, in the transmission signal generating/detecting method, the localization pulses contain a first localization pulse and a second localization pulse, the first localization pulse is generated from the coupling-purpose code sequence that is generated by de-spreading the first localization pulse, and the second localization pulse serving as a localization pulse of the localizing-purpose code sequence is detected from the first localization pulse.

According to the present invention, in the transmission signal generating/detecting method, information on a target object irradiated with the transmission signals is acquired by further detecting a mode of the localization pulses.

According to the present invention, in the transmission signal generating/detecting method, the transmission signals include data generated from source data, the transform signals are signals generated from the code sequence including the sequence to which the data is mapped, and the source data are decoded based on the code sequence determined by detecting the localization pulses.

According to the present invention, in the transmission signal generating/detecting method, the transmission signals are signals transmitted to a measurement target, and information on the measurement target is acquired by use of the mode and/or characteristics of the localization pulses that are calculated by detecting the signals based on the transmission signals from the measurement target.

An aspect of the present invention includes the amplitude, the polarity, the delay and the shift time of the localization pulse.

To accomplish the objects described above by solving the problems inherent in the conventional examples, according to the present invention, a communication system using code sequences on the basis of the transmission signal generating/detecting method using the code sequences includes:

a transmission apparatus having: input means to generate data from source data; mapping means to generate a spreading-purpose code sequence, a coupling-purpose code sequence and a localizing-purpose code sequence, which include sequences to which data are mapped; multiplexing-spread signal generating means to generate a multiplexing-spread chip sequence with a multiplicity being equal to or larger than "1" by multiplexing a spread chip sequence formed in a way that multiplies a spreading-purpose code sequence and a chip of a coupling-purpose code sequence with a chip of a localizing-purpose code sequence with respect to the chips of the coupling-purpose code sequence; transforming means to generate transform signals by transforming at least a single multiplexing-spread chip sequence or a plurality of multiplexing-spread chip sequences; transmission-purpose signal generating means to generate a transmission-purpose signal for generating the transmission signal from at least the transform signal; and transmitting means to generate the transmission signal from the transmission-purpose signal and transmit the transmission signal; and a reception apparatus having: transmission signal detecting means to detect the transmission signals transmitted from the transmission apparatus and based on transform signals generated by transforming the multiplexing-spread chip sequence containing data; transform signal processing means to acquire the multiplexing-spread chip sequence in a time domain or a frequency domain from the transform signals detected from the transmission signals; detection enabling means to generate the coupling-purpose code sequence by de-spreading spread chip sequences contained in the acquired multiplexing-spread chip sequence with the spreading-purpose code sequence; determining means to determine the code sequence by detecting localization pulses of the coupling-purpose code sequence from an output of at least the detection enabling means; and decoding means to decode source data from the determined code sequence.

According to the present invention, in the communication system using the code sequences, the transform signals are multiplexed OFDM signals with a multiplicity being equal to or larger than "1" that are obtained by multiplexing OFDM signals generated by a frequency division method determined per multiplexing-spread chip sequence, the transforming means generates the multiplexed OFDM signals, the transmission signal detecting means detects the multiplexed OFDM signals, and the transform signal processing means acquires the multiplexing-spread chip sequence of the OFDM signals in the frequency domain by transforming the multiplexed OFDM signals of the transmission signals into the frequency domain.

According to the present invention, in the communication system using the code sequences, the transform signals are multiplexed Wavelet OFDM signals with a multiplicity being equal to or larger than "1" that are obtained by multiplexing Wavelet OFDM signals generated by predetermined Wavelet and/or by predetermined parameter settings per multiplexing-spread chip sequence, the transforming means generates the multiplexed Wavelet OFDM signals, the transmission signal detecting means detects the multiplexed Wavelet OFDM signals, and the transform signal processing means acquires a Wavelet coefficient of the multiplexed Wavelet OFDM signals representing the multiplexing-spread chip sequence by detecting the Wavelet coefficient of the multiplexed Wavelet OFDM signals.

According to the present invention, in the communication system using the code sequences, the transmission signals are hopping signals generated by modulating hopping carrier waves with at least the transform signals, the transmitting means generates the hopping signals, the transmission signal detecting means detects and demodulates the hopping signals, and the transform signal processing means acquires the multiplexing-spread chip sequence in the frequency domain or the time domain from the transform signals possessed by the transmission signals.

According to the present invention, in the communication system using the code sequences, the transmission signals are modulation signals generated by modulating carrier waves with at least the transform signals, the transmitting means generates the modulation signals, the transmission signal detecting means demodulates the modulation signals, and the transform signal processing means acquires the multiplexing-spread chip sequence in the frequency domain or the time domain from the transform signals possessed by the transmission signals.

According to the present invention, in the communication system using the code sequences, the transmission signals are signals formed by including at least the transform signals, the transmitting means generates the transmission signals, the transmission signal detecting means detects the transmission signals from at least the transform signals, the transform signal processing means acquires the multiplexing-spread chip sequence in the frequency domain or the time domain from the transform signals of the transmission signals.

The present invention is a transmission apparatus of the communication system using the code sequences.

The present invention is a reception apparatus of the communication system using the code sequences.

To accomplish the objects described above by solving the problems inherent in the conventional examples, according to the present invention, a measurement system using code sequences on the basis of the transmission signal generating/detecting method using the code sequences includes:

a transmission apparatus having: spread signal generating means to generate a multiplexing-spread chip sequence with a multiplicity being equal to or larger than "1" by multiplexing a spread chip sequence formed in away that multiplies a spreading-purpose code sequence and a chip of a coupling-purpose code sequence with a chip of a localizing-purpose code sequence with respect to the chips of the coupling-purpose code sequence; transforming means to generate transform signals from a single multiplexing-spread chip sequence or a plurality of multiplexing-spread chip sequences; transmission-purpose signal generating means to generate a transmission-purpose signal for generating the transmission signal from at least the transform signal; and transmitting means to generate the transmission signal based on the transmission-purpose signal and transmit the transmission signal to a target object; and a reception apparatus having: transmission signal detecting means to detect the transmission signals; spread chip sequence acquiring means to acquire the multiplexing-spread chip sequence in the time domain or the frequency domain from the transform signals of the transmission signals; detection enabling means to generate the coupling-purpose code sequence by de-spreading spread chip sequences acquired by the spread chip sequence acquiring means and contained in the multiplexing-spread chip sequence with the spreading-purpose code sequence of the spread chip sequences; localization pulse detecting means to detect localization pulses of the coupling-purpose code sequence from an output of at least the detection enabling means; and measuring means to acquire information on the target object by detecting a mode of the localization pulses.

According to the present invention, in the measurement system using the code sequences, the transform signals are multiplexed OFDM signals with a multiplicity being equal to or larger than "1", the transforming means generates the multiplexed OFDM signals defined as the transform signals by generating and multiplexing the OFDM signals from the multiplexing-spread chip sequence, the transmitting means generates and transmits the transmission signals on the basis of the multiplexed OFDM signals; the transmission signal detecting means detects the transmission signals; and the spread chip sequence acquiring means acquires the multiplexing-spread chip sequence represented by the OFDM signals in the frequency domain by transforming the multiplexed OFDM signals of the transmission signals into the frequency domain.

According to the present invention, in the measurement system using the code sequences, the transform signals are multiplexed Wavelet OFDM signals with the multiplicity being equal to or larger than "1", the transforming means generates the multiplexed Wavelet OFDM signals defined as the transform signals by generating the Wavelet OFDM signals from the multiplexing-spread chip sequence and multiplexing these Wavelet OFDM signals, the transmitting means generates and transmits the transmission signals on the basis of the multiplexed Wavelet OFDM signals, the transmission signal detecting means detects the transmission signals, and the spread chip sequence acquiring means acquires the multiplexing-spread chip sequence represented by a Wavelet coefficient of the Wavelet OFDM signals from the Wavelet coefficient calculated from the multiplexed Wavelet OFDM signals of the transmission signals.

According to the present invention, in the measurement system using the code sequences, the spread chip sequence acquiring means, in place of acquiring the multiplexing-spread chip sequence represented by the Wavelet coefficient of the Wavelet OFDM signals from the Wavelet coefficient calculated from the multiplexed Wavelet OFDM signals of the transmission signals according to claim 25, acquires the multiplexing-spread chip sequence by DFT-trans forming the multiplexed Wavelet OFDM signals of the transmission signals.

The target information includes industrial applications dealing with the type of the component of the blood, the state of the component thereof, the concentration of the component thereof, a composition of a specified biometric tissue, etc.
Raman scattering includes Raman-Stokes scattering and Anti-Raman Stokes Scattering.

For example, a case of measuring a plurality of blood components involves using spectrums counted equal to or larger than the number of substances. Using the present invention, a plurality of components of gases, liquids and solid states using spectrums counted equal to or larger than the number of substances is also measurable.

Effects of the Invention

According to the present invention, the transmission signals are generated based on the multiplexing-spread chip sequence multiplexed by spreading the chips of the code sequences with the spreading-purpose code sequence and can be therefore detected by consecutively executing the de-spreading process and the localizing process in series, the narrowband noises and the broadband noises can be removed from the detection signals, and the improvement rate of the SN ratio becomes higher than by all the conventional methods.

Furthermore, in the transmission signals using the transform signals defined as the multiplexed OFDM signals or the multiplexed Wavelet OFDM signals that are generated by transforming and multiplexing the multiplexing-spread chip sequence so as to be orthogonal in at least the frequency domain, the SN ratio of the received transmission signals is improved to a much greater degree owing to a multiplier effect among the transforming process into the frequency domain, the de-spreading process and the localizing process. As a result, the multiplexing-spread chip sequence can be acquired per OFDM signal, and, if the transmission signals contain the data, a transmission speed can be accelerated synergistically owing to the multiplicity of the multiplexed OFDM signals or the multiplexes Wavelet OFDM signals and the multiplicity of the multiplexing-spread chip sequence. Especially in a high-speed bandwidth, a speed-up scheme can be attained with a lower amplitude value than by the conventional methods, and a request for linearity of an amplifier is reduced.

On the other hand, in the measurement system, the measurement target is irradiated with the transmission signals of a variety of energy mediums based on the transform signals, the mode of the localization pulses thereof is measured, whereby items of information of attenuation, absorption, reflection, radiation, dispersion, transmission, delay time, a distance, etc and information of a propagation medium related to the measurement target can be acquired at the high improvement rate of the SN ratio. The acquirable items of information are not, however, limited to those described above.

BRIEF DESCRIPTION OF THE DRAWINGS

FIG. 21 illustrates an OCT system according to the present invention

EMBODIMENT

Mode for Carrying Out the Invention

Figure 1:
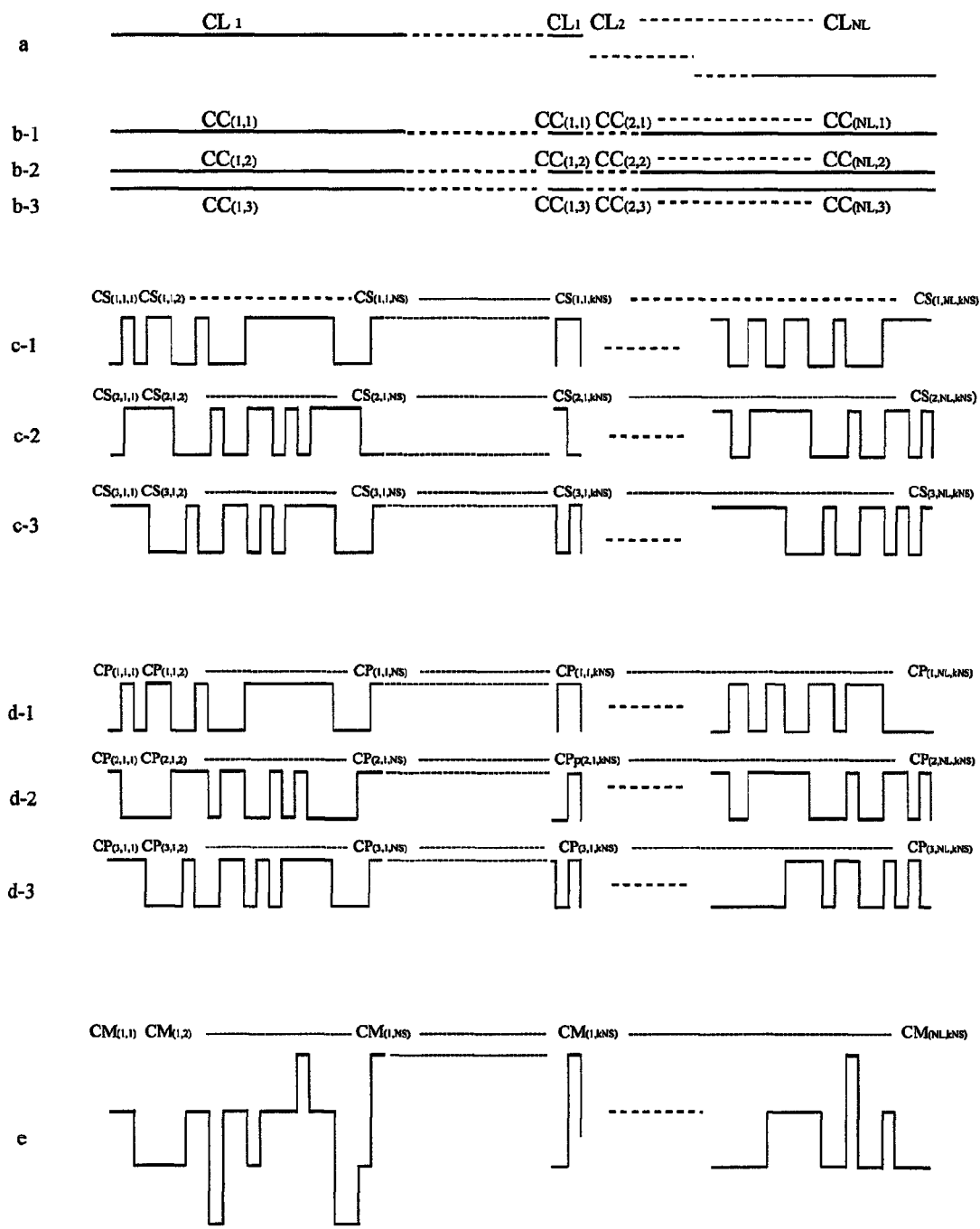
FIG. 1 is an explanatory diagram illustrating a method of generating a multiplexing-spread chip sequence with a code sequence LC being used at one cycle in a transmission apparatus using the code sequences according to an embodiment of the present invention.

An embodiment of the present invention will hereinafter be described with reference to the drawings. A transmission signal generating method and a transmission apparatus according to an embodiment of the present invention are configured to generate transmission signals on the basis of transform signals generated by transforming a multiplexing-spread chip sequence or scrambled multiplexing-spread chip sequences with a multiplicity being equal to or larger than "1", into which spread chip sequences obtained by multiplying chips of a spreading-purpose code sequence (which will hereinafter be referred to as Spreading Code abbreviated to SC) and chips of a coupling-purpose code sequence (which will hereinafter be referred to as Coupling Code abbreviated to CC) by chips of a localizing-purpose code sequence (which will hereinafter be referred to as Localizing Code abbreviated to LC or Code Sequence for Localization), are multiplexed with respect to the chips of the code sequences for coupling. This configuration makes it possible to generate the transmission signals capable of materializing a large improvement rate of the SN ratio on a receiving side.

The spreading-purpose code sequence (SC) is defined as a spreading-purpose code sequence pulses. According to the embodiment, the SC is used for forming multiplexed signals as by being multiplexed after being coupled with the chips of the CC and for spreading the chips of the LC with the multiplexed signals. To be specific, in the embodiment, the SC involves:

1. mapping data, i.e., performing a circular shift according to the data;
2. spreading the chips of the localizing-purpose code sequence (LC) after the data have been mapped if a code length of the coupling-purpose code sequence (CC) is "1"; and
3. coupling the data with the CC and then multiplexing the data after being mapped in a plurality of SCs if the code length of the CC is equal to or larger than "2", and spreading the chips of the LC.

Note that a basic status of the SC is predetermined and stored in, e.g., a memory etc, and is given such as a chip sequence of SC=(1, 1, 1, −1, −1, 1, −1). The chip sequence of the SC can be realized by using, e.g., a shift register. In the case of mapping the data to the SC, byway of one example, the status of the chip sequence described above is determined to be "0", and a relation between the SC and the data is set such as:

Data 0: (1, 1, 1, −1, −1, 1, −1)
Data 1: (−1, 1, 1, 1, −1, −1,1)
Data 2: (1, −1, 1, 1, 1, −1, −1)
Data 3: (−1, 1, −1, 1, 1, 1, −1).

For example, the data 1 is data obtained by circularly shifting the status of the data 0 by one rightward.

Further, the coupling-purpose code sequence (CC) is a code sequence for linearly coupling a plurality of code pulse trains for spreading and thus multiplexing the pulse trains. In the embodiment, the CC subordinates the spread code pulse train by multiplying the chips of the CC and the spread code pulse train together. Simultaneously, the embodiment facilitates detecting localization pulses generated by localizing the chips of the CC that are de-spread in the SC.

Note that in the embodiment, with the CC being used, the multiplicity of the chip sequence after being multiplexed is equivalent to the code length of the CC. Therefore, when making the detection, the chips of the spreading-purpose code sequence (SC) are demultiplexed, and hence the chips are localized by the CC, whereby the localization signals for the CC are generated. Then, in de-spreading of the SC, each SC has a shift status equivalent to the code length, then the shift time of the SC is therefore varied, and the de-spreading is conducted the same number of times as a value of the varied shift time. Whether the de-spreading is carried out for the valid shift time or not can be determined by detecting the localization pulses of the CC and measuring such a tuple of shift time as to obtain a maximum pulse.

Furthermore, the localizing-purpose code sequence (LC) is a code sequence used for determining the shift time of the SC by calculating the localization signals from the chips structured of the localization signals of the CC and detecting the maximum localization pulse.

In the detection of the maximum localization pulse, reception signals corresponding to the respective chips of the LC are de-spread in a way that varies the shift time of the SC, thereby demultiplexing the chips of the CC. To give one example, the code length of the LC is set to "7", the code length of the CC is set to "3", and the code length of each of three types of SCs is set "7". Note that types and basic statuses of the one-sequence LC and CC each shall undergo initial settings, the types and the basis statuses of the three types of SCs shall also undergo the initial settings, and the shift status shall vary depending on the data.

In this case, according to the embodiment, at first, such a process is executed as to perform de-spreading by multiplying a first chip of the CC in a way that varies the shift time of the first SC. In this process, the de-spreading is conducted with respect to each of seven shift statuses in the first SC.

The de-spreading is performed by multiplying the signal by the SC being multiplied (i.e., the signal being spread by the SC) again by the same SC.

Similarly, the process is executed, in which the de-spreading is performed by, while varying the shift time of each of the second and third SCs, multiplying the reception signal corresponding to each of the chips of the LC by the shift time of each of the second and third SCs each corresponding thereto by circularly shifting the shift time. Note that processes related to the de-spreading performed 343 times (7×7×7=343) are executed for demultiplexing the three chips of the CC by de-spreading.

Subsequently, the localization signals of the CC are calculated by using all of the 343 de-spreading values, thus detecting the maximum localization pulse. Note that when the shift time becomes coincident with the shift time of the transmission signal in the entire 3-tuple SCs, the localization signal gets maximized. Incidentally, in place of detecting the localization pulses of the CC after completing all the de-spreading processes, the maximum localization pulse may be determined by de-spreading the reception signals in a manner that sequentially circularly shifts the shift time of each of the three types of SCs, calculating the localization signals of the CC per de-spreading and thus detecting the maximum value thereof.

As noises contained in the transmission signals become louder, there is more of a possibility that neither the thus-obtained maximized signal nor the data can be detected. By contrast, in the embodiment, the maximum localization pulse obtained by calculating the localization signals of the LC in a way that employs all of the 343 de-spreading values of the respective chips, is detected as the localization pulse of the LC. The localization pulse of the LC is given when the SC gets properly coincident in the entire chips, and hence this status is stored, thereby enabling the shift status of each SC and therefore the data to be detected.

The obtainment of the localization pulse of the LC, however, involves de-spreading the seven chips each 343 times (7 to the power of 3) and performing an arithmetic operation for detecting the localization signals about the LC, and hence the arithmetic operations are conducted $7^{21}$ times (7 to the power of 21, which is approximately 10 to the power of 18). The localization pulse, as will be described later on, is detected in order to speed up the arithmetic operation.

Note that the basic status of the LC is predetermined and stored in the memory etc, and is given such as the chip sequence of LC=(1, 1, 1, −1, −1, 1, −1). The LC can be realized by use of, e.g., the shift register.

Further, in the embodiment, the SC can involve using code sequences such as an M-sequence (maximal length sequence), a Gold code sequence and a Kasami code sequence. Moreover, the CC can involve using the M-sequence, the Gold code sequence and the Kasami code sequence, of which the code length is equal to or larger than "1". Furthermore, the LC can involve employing the M-sequence, the Gold code sequence and the Kasami code sequence, of which the code length is equal to or larger than "1". Note that the code sequence, of which the code length is "1", includes pulses of which an amplitude of +1 or −1.

Further, a transmission signal detecting method and a transmission signal detecting apparatus according to the embodiment of the present invention, are configured to detect the transmission signals, to acquire the multiplexing-spread chip sequence in a time domain or a frequency domain from transform signals of the transmission signals, to generate the coupling-purpose code sequence by de-spreading this multiplexing-spread chip sequence with the spreading-purpose code sequence of the spread chip sequence, and to detect the localization pulses from at least the coupling-purpose code sequence. Note that the localization pulse of the code sequence with the code length being "1" is a positive pulse of which the amplitude is proportional to the amplitude of the code sequence. This configuration enables a reception apparatus to detect the transmission signals at a large improvement rate of the SN ratio.

Moreover, a communication system according to the embodiment of the present invention includes the transmission apparatus and the reception apparatus described above, in which the transmission signals contain several types of the code sequences, the shift time of each code sequence and/or data mapped to polarities, and the data can be transmitted at the high improvement rate of the SN ratio even on communication channels with narrowband noises and broadband noises being superposed on each other. The localization pulses are, as described above, detected from the transmission signals at the high improvement rate of the SN ratio, and a transmission speed is accelerated synergistically by the multiplicity of the multiplexing-spread chip sequence and the multiplicity of the transform signals generated by transforming the multiplexing-spread chip sequence into signals and multiplexing these signals. Moreover, the speed-up scheme can be attained by reducing a symbol length in a way that makes use of the high SN ratio. Note that the transmission signals can be generated after a control signal and a preamble contained in the transmission signals have been transformed into the transform signals in the same way with the data, however, the transmission signals may also be transmitted in a different format or by a different method.

A measuring system according to the embodiment of the present invention is configured to acquire information related to a target object by transmitting the transmission signals based on the transform signals generated by transforming the multiplexing-spread chip sequence to the target object, detecting the transmission signals from the target object, acquiring the multiplexing-spread chip sequence from the transform signals thereof, and detecting the localization pulses from signals given by de-spreading the spread chip sequence. This configuration enables the target object in a noise environment to be measured.

Principles and configuring methods of a method of generating the transmission signals by use of the code sequence, a transmission apparatus, a method of detecting the transmission signals by use of the code sequence and a reception apparatus, will hereinafter be described with reference to the drawings. The generation of the spread chip sequence for generating the transmission signals in FIG. 1 involves multiplying k-tuple of SC chips, k-tuple of CC chips and k-tuple of LC chips per LC chip together, where "k" is a positive integer. Especially, it is preferable that each of the code lengths of the CC and the LC is equal to or larger than "1", while the code length of the SC is equal to or larger than "7". Further, the multiplexing-spread chip sequence can be generated by multiplexing the different chips of the SC, the different chips of the CC and the chips of the LC by multiplying these chips or by multiplexing the different chips of the SC and the different chips of the CC by multiplying these chips and then multiplying the signals thereof and the chips of the LC together. A combination of different types of sequences or the same type of sequences within an identifiable range can be used for tuples of these code sequences SC. As a substitute for the configuration in FIG. 1, the transmission signals may be generated and transmitted/received based on the multiplexing-spread chip sequence taking a configuration in FIG. 2.

In FIG. 1, a symbol "a" represents the LC, and chips of the LC are given such as $CL_1, \ldots, CL_{NL}$. Herein, the symbol "NL" indicates a code length of the LC.

A symbol "b-1, . . . , b-3" represents the CC, then, for simplifying the description, the present example demonstrates a case where the code length is "3", and the chips are given such as "1, −1, 1". Note that a multiplicity "m" of the multiplexing-spread chip sequence to be generated is equal to the code length of the CC and is therefore "3" in the present example, however, a code length of "1" or larger can be set by selecting the CCs. Moreover, the CC takes the same value with respect to each of $CL_1, \ldots, CL_{NL}$, however, the code sequences can be also selected per $CL_j$ (j=1, . . . , NL). However, the symbol "j" represents the j-th chip of the LC. Note that in the chip sequence of "b-1", $CC_{(j, 1)}$ corresponds to $CL_j$ (j=1, . . . , NL). The same is applied to the chip sequences of "b-2" and "b-3".

Further, "c-1, . . . , c-3" represents a tuple of SCs with the data being mapped to the shift time. K-tuple of SCs are contained with respect to CL (j=1, . . . , NL). Different types of code sequences are employed for these SCs, or alternatively the same type of code sequences can be used in a detectable range. Note that the symbol "NS" in the drawing indicates the code length of the SC. Moreover, "$CS_{(1, j, 1)}$–$CS_{(1, j, kNS)}$" in "c-1" correspond to "$CL_j$ (j=1, . . . , NL)". This point is the same with "c-2" and "c-3".

The spread chip sequence "CP(1, 1, 1), . . . , $CP_{(1, 1, kNS)}$" corresponding to "$CL_1$" of "d-1" is generated by multiplying "$CL_1$", the chips of the corresponding CC of "b-1" and the corresponding SC of "c-1 together. Similarly, there are generated the spread chip sequence corresponding to "$CL_1$" of "d-2" and the spread chip sequence corresponding to "$CL_1$" of "d-3". Subsequently, these spread chip sequences are multiplexed, thereby generating a multiplexing-spread chip sequence "$CM_{(1, 1)}$–$CM_{(1, kNS)}$" corresponding to "$CL_1$" of "e". Especially, the transform signals are generated by transforming the multiplexing-spread chip sequence into signals being orthogonal at least in the frequency domain and then multiplexing these orthogonal signals, in which case the multiplexing-spread chip sequences of which the number is equivalent to the multiplicity of the transform signals per LC chip. Similarly, the multiplexing-spread chip sequence with respect to "$CL_j$ (j=2, . . . , NL)" is generated. Note that an array of (k×k NL×NS) (which will hereinafter be also termed kNLNS)—number of chips is not limited to what has been described above but may be based on a predetermined order such as scrambling. Moreover, the transform signals may also be of a multiplexing-spread chip sequence.

Figure 2:
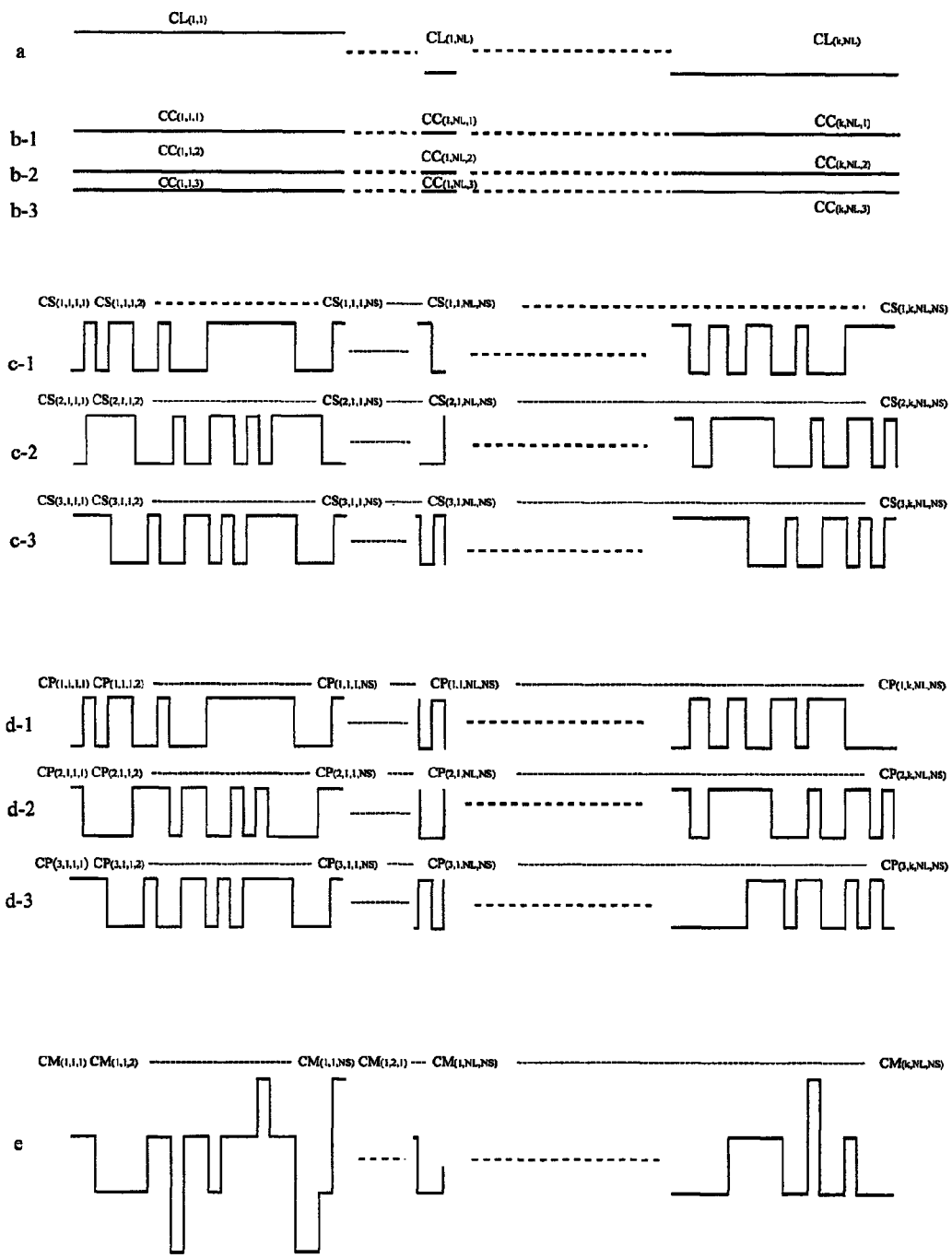
FIG. 2 is an explanatory diagram illustrating the method of generating the multiplexing-spread chip sequence with a code sequence LC being used at a plurality of cycles in the transmission apparatus using the code sequences according to the embodiment of the present invention.

Further, the multiplexing-spread chip sequence may also be generated based on the configuration in FIG. 2 in place of the configuration in FIG. 1. In FIG. 2, the symbol "a" represents the code sequence LC, the k-tuple of LCs are consecutively disposed in a time-base direction, and a chip array thereof is given such as "$CL_{(1,1)}, \ldots, CL_{(1, NL)}, CL_{(2, 1)}, \ldots, CL_{(2, NL)}, \ldots, CL_{(k, NL)}$".

The symbol "b-1, . . . , b-3" denotes the CCs, then, for simplifying the description, the code length is "3" in the present example, and the chips are given such as "1, −1, 1". The multiplicity "m" of the multiplexing-spread chip sequence to be generated is equal to the code length of the CC and is therefore "3" in the present example, however, the code length of "1" or larger can be set by selecting the CCs. In the present example, the CC takes the same value with respect to each of $CL_{(1, 1)}, \ldots, CL_{(k, NL)}$, however, the code sequences can be also selected per chip of the LC. Furthermore, the symbol "c-1, c-3" represents a tuple of SCs with the data being mapped to the shift time. The respective chips expressed by $CL_{(i,j)}$ (i=1, . . . , k, j=1, . . . , NL) are multiplied by the SCs consisting of different types of code sequences or the same type of code sequences in the detectable range.

The spread chip sequences "$CP_{(1, 1, 1, 1)}, \ldots, CP_{(1, k, NL, NS)}$" of "d-1" are generated by multiplying "$CL_{(1, 1)}, \ldots, CL_{(k, NL)}$", the corresponding chips of "b-1" and the corresponding SC of "c-1" together. Generated similarly are the spread chip sequences of "d-2" and "d-3" corresponding to $CL_{(i, j)}$ (i=1, . . . , k, j=1, . . . , NL).

Subsequently, the multiplexing-spread chip sequences "$CM_{(i, j, 1)}, CM_{(i, j, NS)}$" (i=1, . . . , k, j=1, . . . , NL) corresponding to "$CL_{(i, j)}$" of "e" are generated by multiplexing these spread sequences. These chip sequences, though corresponding to the respective LCs and consisting of ($CM_{(1, 1, 1)} \ldots CM_{(1, NL, NS)}$), ($CM_{(2, 1, 1)} \ldots CM_{(2, NL, NS)}$), . . . , ($CM_{(k, 1, 1)}, \ldots CM_{(k, NL, NS)}$), are configured so that a chip count kNLNK is equal to or smaller than a sub-channel count "n" in the case of the transform signals generated by transforming the multiplexing-spread chip sequence into the signals being orthogonal at least in the frequency domain and by multiplexing these signals. Note that the array of the kNLNK-number of chips is not limited to what has been described above but may be based on the predetermined order such as scrambling.

Figure 3:
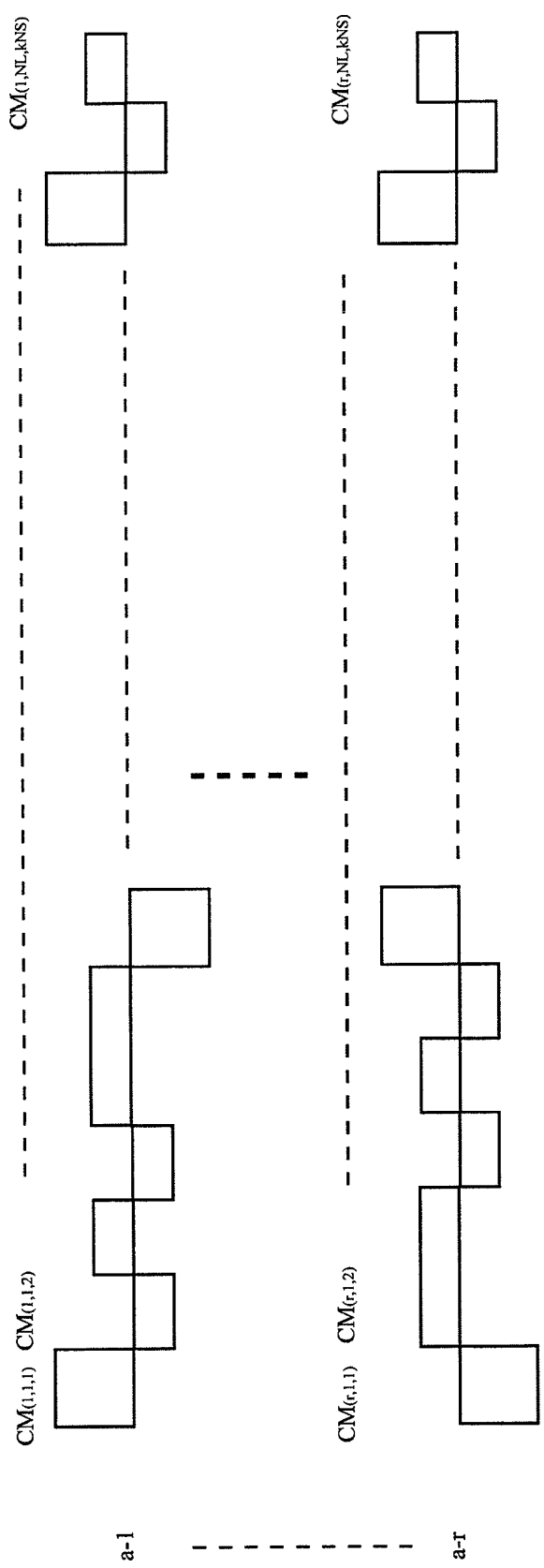
FIG. 3 is an explanatory diagram illustrating a plurality of multiplexing-spread chip sequences of which chips are parallel-transformed into subbands in the transmission apparatus using the code sequences according to the embodiment of the present invention.

FIG. 3 illustrates time series including (k×NL)-tuple (which will hereinafter be also termed kNL) of multiplexing-spread chip sequences with the code length being "NS" depicted in FIG. 1, in which the axis of abscissa indicates the time base. In the chip sequence "a-1", the kNLNK-number of chips are transformed in parallel and undergo, after being subsequently mapped, IDFT (Inverse Discrete Fourier Transform) or IDWT (Inverse Discrete Wavelet Transform). The chip count of the multiplexing-spread chip sequence is preferably a positive integral multiple of "NS" without being limited to "NS" but may not necessarily be confined to this value and may also be determined corresponding to a subband count "n". Further, though not illustrated in the drawing, the kNLNK-number of scrambled chips may be transformed in parallel and subsequently mapped. With respect to a required number of multiplexing-spread chip sequences down to the sequence "a-r", it is feasible to generate multiplexed OFDM signals with the multiplicity being "r", which is defined as one of the transform signals, by generating and multiplexing OFDM signals in the way of using a different frequency division method. Similarly, it is possible to generate multiplexed Wavelet OFDM signals with the multiplicity being "r", which is defined as one of the transform signals, by performing predetermined settings in a Wavelet scaling coefficient and/or a shift parameter from each of the multiplexing-spread chip sequences down to "a-r" in which the chips are arrayed in parallel, and generating and multiplexing the Wavelet OFDM signals. The transmission signals are generated based on the thus-generated multiplexed OFDM signals or multiplexed Wavelet OFDM signals. Similarly, the transmission signals can be generated based on the multiplexed OFDM signals or the multiplexed Wavelet OFDM signals generated by transforming the multiplexing-spread chip sequences in FIG. 2 in place of the transform signals using the multiplexing-spread chip sequences depicted in FIG. 1.

Figure 4:
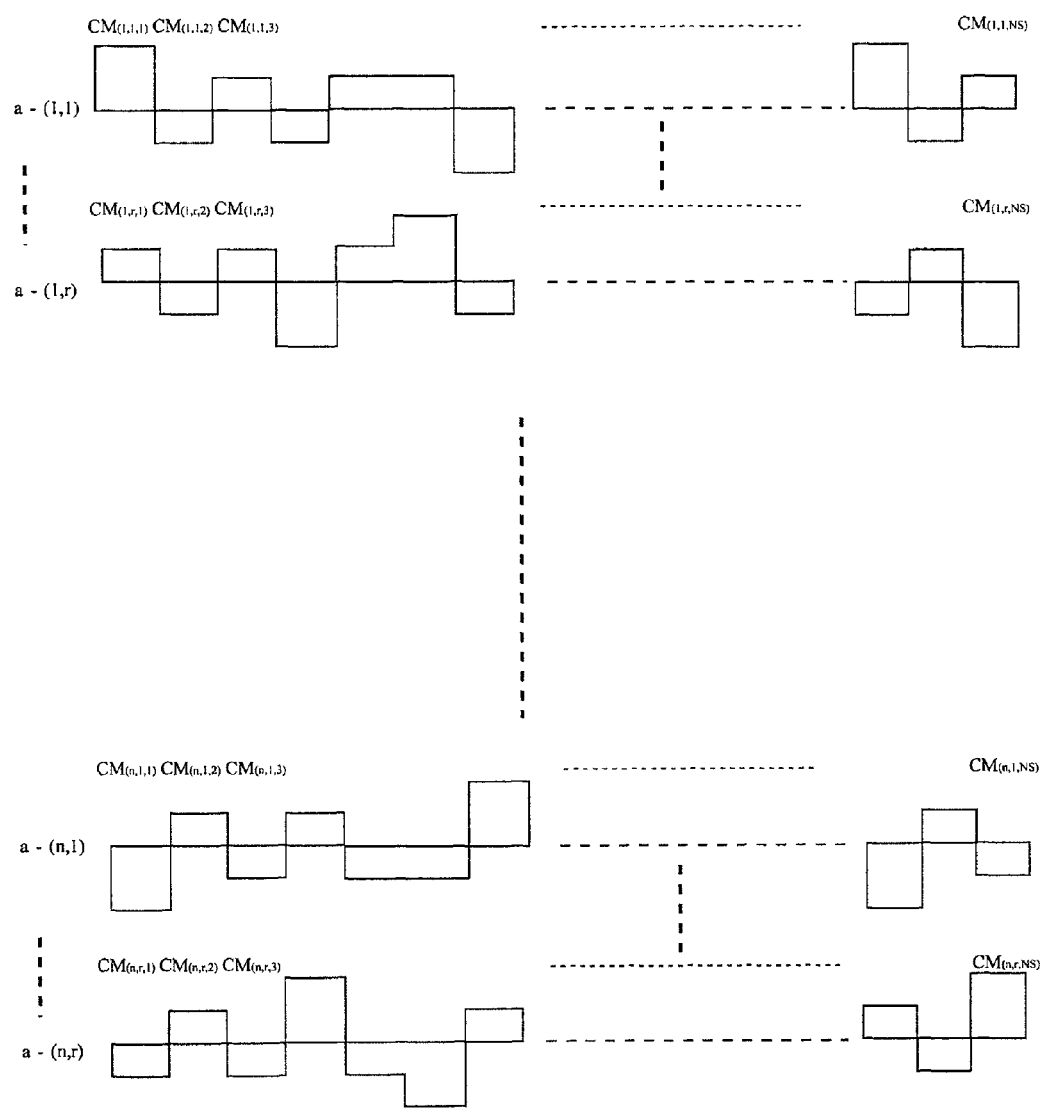
FIG. 4 is an explanatory diagram illustrating the multiplexing-spread chip sequences allocated in time-series to the respective subbands in the transmission apparatus using the code sequences according to the embodiment of the present invention.

FIG. 4 illustrates time series of the multiplexing-spread chip sequences for generating the transform signals by allocating the time series of the multiplexing-spread chip sequences to the respective subbands, and a symbol "a-(u, 1), ..., a-(u, r)" (where aggregation of u=1, ..., n,) corresponds to an r-tuple of multiplexing-spread chip sequences allocated to a u-th subband, in which the axis of abscissa indicates the time base. An i-th OFDM signal is generated in such a way that let "i" be a designated number from "1" up to "r", and chips CM(u, i, j) (where, j=1, ..., NS) synchronized with respect to "j" with "u" ranging from "1" to "n" are IDFT-trans formed by the frequency division method that differs on a per "i" basis. Similarly, the OFDM signals are generated for all "i" and then multiplexed, thereby generating the multiplexed OFDM signals. Note that FIG. 4 exemplifies the case of transforming the multiplexing-spread chip sequences of which the code length is "NS", however, the multiplexing-spread chip sequences, of which the chip count is the positive integral multiple of the code length, may also be used. Further, in the case of using the Wavelet, Wavelet OFDM signals are generated in such a manner that let "i" be the designated number from "1" up to "r", a scaling coefficient defined as a Wavelet parameter and/or a shift parameter is set on the per "i" basis by a predetermined method, and the chips CM(u, i, j) (where, j=1, ..., NS) synchronized with respect to "j" with "u" of "a-(u, i) ranging from "1" to "n" are IDWT-transformed. This step is executed with respect to all "i" in each "j", then the Wavelet OFDM signals are generated and multiplexed, whereby multiplexed Wavelet OFDM signals with the multiplicity being "r" are generated. The transmission signals are generated based on these multiplexed OFDM signals or multiplexed Wavelet OFDM signals. Note that if "k" is equal to or larger than "2", the transform signal in this format can involve using the multiplexing-spread chip sequence in FIG. 1 or 2.

Figure 5:
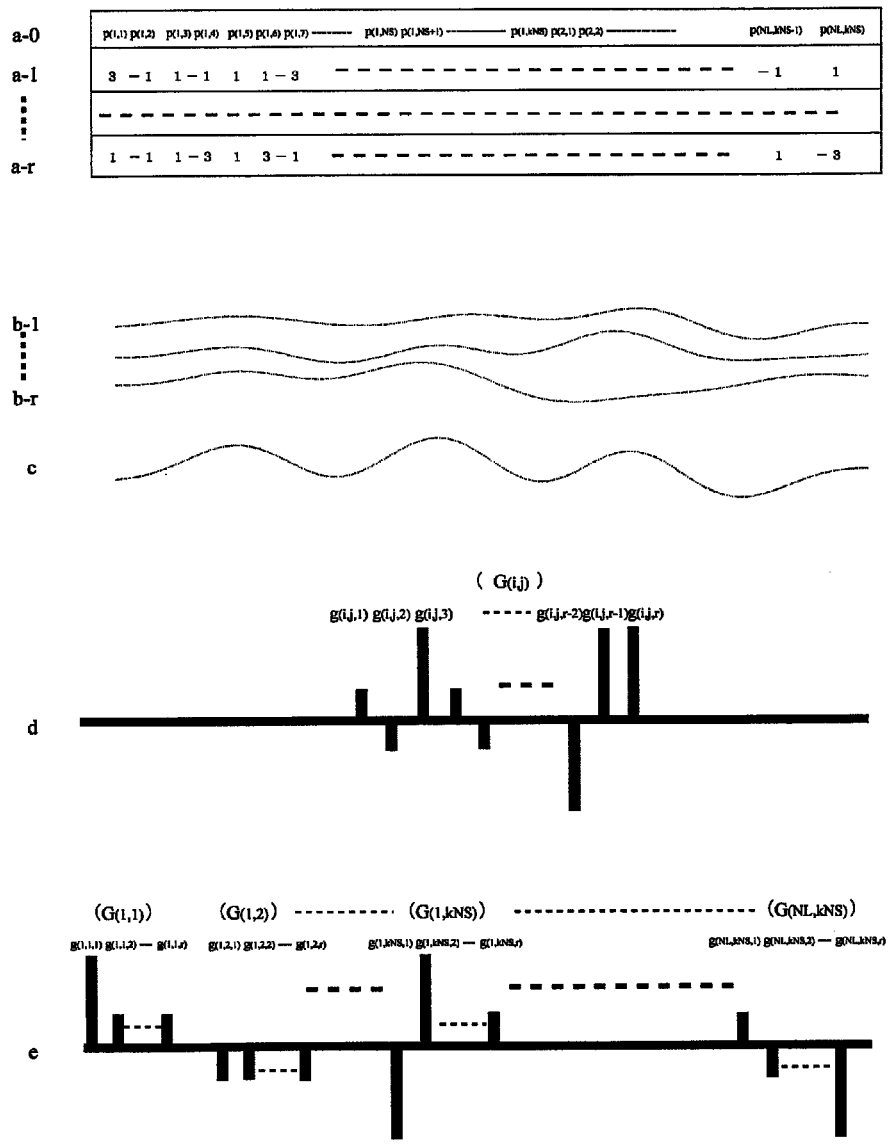
FIG. 5 is an explanatory diagram illustrating transform signals in the transmission apparatus using the code sequences according to the embodiment of the present invention.

FIG. 5 illustrates a transform signal generating method applied to the multiplexed OFDM signals and the multiplexed Wavelet OFDM signals. This example exemplifies a case where let "k" be the positive integer, and the kNLNS-number of chips are transformed into an n-tuple of sub-channels, however, without being limited to this case, an available configuration is that, e.g., (k×NS)—number (which will hereinafter be termed also kNS) of chips are transformed into an n-tuple of sub-channels.

A symbol "p (i, j) (which will hereinafter be designated as a chip point) given in "a-0" represents a j-th chip of the kNS-number of chips of k-tuple of multiplexing-spread chip sequence aggregations in the i-th chip of the LC (i=1, ..., NL, j=1, ..., kNS). A symbol "a-1, ..., a-r" represents values of the chips contained in the multiplexing-spread chip sequences at the respective chip points, in which these values are transformed and multiplexed into the transform signals.

A symbol "b-1, ..., b-r" represents the OFDM signals generated by transforming in parallel the kNLNS-number of chips of "a-1, ..., a-r" corresponding thereto, with the axis of abscissa indicating the time base, and allocating thus-transformed chips to the sub-channels.

A symbol "c" represents the multiplexed OFDM signal generated by multiplexing the OFDM signal.

A symbol "d" represents a time-frequency division subband $G_{(i, j)}$ (where, i=1, ..., NL and j=1, ..., kNS. $G_{(1, j)}$ will hereinafter be referred to as a chip point in the frequency domain) of the multiplexed OFDM signal, and corresponds to "$p_{(i, j)}$" of "a-0". Each $G_{(i, j)}$ consists of "$g_{(j, 1)}, \ldots, g_{(i, j, r)}$" corresponding to the values of the chip points of "a-1, ..., a-r", in which "NS" is the code length of the SC, and $\Delta_{(i, j, h)}$ is an interval between $g_{(i, j, h)}$ and $g_{(i, j, h+1)}$ (where, h=1, ..., r-1).

A symbol "e" indicates a central frequency component of the subband of each OFDM signal contained in the multiplexed OFDM signals according to the present invention, in which the axis of abscissa indicates a frequency, and the axis of ordinate indicates a magnitude of the frequency component. $G_{(i, j)}$ (where i=1, ..., NL and j=1, ..., kNS) is the subband corresponding to the j-th chip of the k-tuple of spread chip sequences with the code length being "NS" in the i-th chip of the LC, and consists of "$g_{(i, j, 1)}, \ldots, g_{(i, j, r)}$" corresponding to "a-1, ..., a-r". Herein, $\Delta_{(i, j, h)}$ is the interval between $g_{(i, j, h)}$ and $g_{(i, j, h+1)}$ (where, h=1, ..., r-1).

The transmission signals, though containing the multiplexing-spread chip sequence signals of "e" in FIG. 1 and the multiplexed OFDM signals of "c" in FIG. 5, without being limited to these signals, include modulation signals generated based on the transform signals by modulating carrier waves with any one of the multiplexing-spread chip sequence and an impulse train thereof, hopping signals generated by modulating hopping carrier waves, the multiplexed OFDM signals and the multiplexed Wavelet OFDM signals generated by multiplexing the OFDM signals and the Wavelet OFDM signals that are generated from the multiplexing-spread chip sequences and are orthogonal at least in the frequency domain, modulation signals generated by modulating the carrier waves with the signals being orthogonal in the frequency domain or with the multiplexed signals thereof, or hopping signals generated by modulating the hopping carrier waves. The OFDM signals and the Wavelet OFDM signals are composed of actual signals or complex signals. Note the transmission signals can include a preamble, a postamble, a control signal and a synchronous signal.

Subsequently, a method of acquiring the multiplexing-spread chip sequence in the frequency domain from the transform signals will hereinafter be described. Let $G_{(i, j)}$ (where i=1, ..., NL and j=1, ..., kNS) be a chip point of the frequency domain obtained by DFT-transforming or DWT (Discrete Wavelet Transform)—transforming the transform signals, and let "$g_{(i, j, 1)}, g_{(i, j, 2)}, \ldots, g_{(i, j, r)}$" be an aggregation of the components of the chip point. Let "Ra" and "Rf" be the number of preceding chip point and the number of subsequent chip point respectively, which have influence the chip point $G_{(i, j)}$, and influence from the component of the chip point, influence from (r×Ra)—number of preceding components and influence from (r×Rf)—number of subsequent components are added to the points in the vicinity of $G_{(i, j)}$. Accordingly, let $s_u$ (where, u=1, ..., r(Ra+Rf)+r) be a value of a u-th point in "r(Ra+Rf)+r" points taken in the vicinity of $G_{(i, j)}$, let "$x_v$" (v=1, 2, ..., r(Ra+Rf)+r) be a value of each component at this point, and let "$a_{(u, v)}$" be a coefficient of "$x_v$", the expression (1) is established.

[Mathematical Expression 1]

$$\sum_{v=1}^{r(Ra+Rf+1)} a_{(u,v)} X_v = S_u \quad (1)$$

The value "$a_{(u, v)}$" in the expression (1) can be determined by use of a model for DFT-transforming the multiplexed OFDM signals with the multiplexed OFDM signals and a model for DWT-transforming the multiplexed Wavelet OFDM signals with respect to the multiplexed Wavelet OFDM signals. Let "r" be the multiplicity of the transform signal, let "A" be a matrix containing elements "$a_{(u, v)}$ (where, u, v=1, ..., r(Ra+Rf)+r)), let "X" be a row vector containing an element "$x_v$" (v=1, ..., r(Ra+Rf)+r)) and let "S" be a column vector a containing an element "$s_u$", and the expression (2) is obtained from the expression (1).

[Mathematical Expression 2]

$$AX=S \qquad (2)$$

The expression (3) is established from the expression (2).

[Mathematical Expression 3]

$$X=A^{-1}S \qquad (3)$$

Therefrom, a value of the frequency domain of the chips of the multiplexing-spread chip sequence is acquired. Note that the preceding chip and the subsequent chip exert the symmetric influence, in which case a relation is established such as Ra=Rf. The components of the thus-acquired frequency domain are rearranged to express the multiplexing-spread chip sequence as the necessity may arise.

The multiplexing-spread chip sequence may be acquired by calculating the frequency components corresponding to "d" in FIG. 5 in a way that uses short cycle DFT transforming from the Wavelet OFDM signals generated based on IDWT-transforming in place of generating and demodulating the Wavelet signals on the basis of the combination of IDWT-transforming and DWT-transforming, and calculating the chip values of the multiplexing-spread chip sequence by the same method as DWT-transforming.

Figure 6:
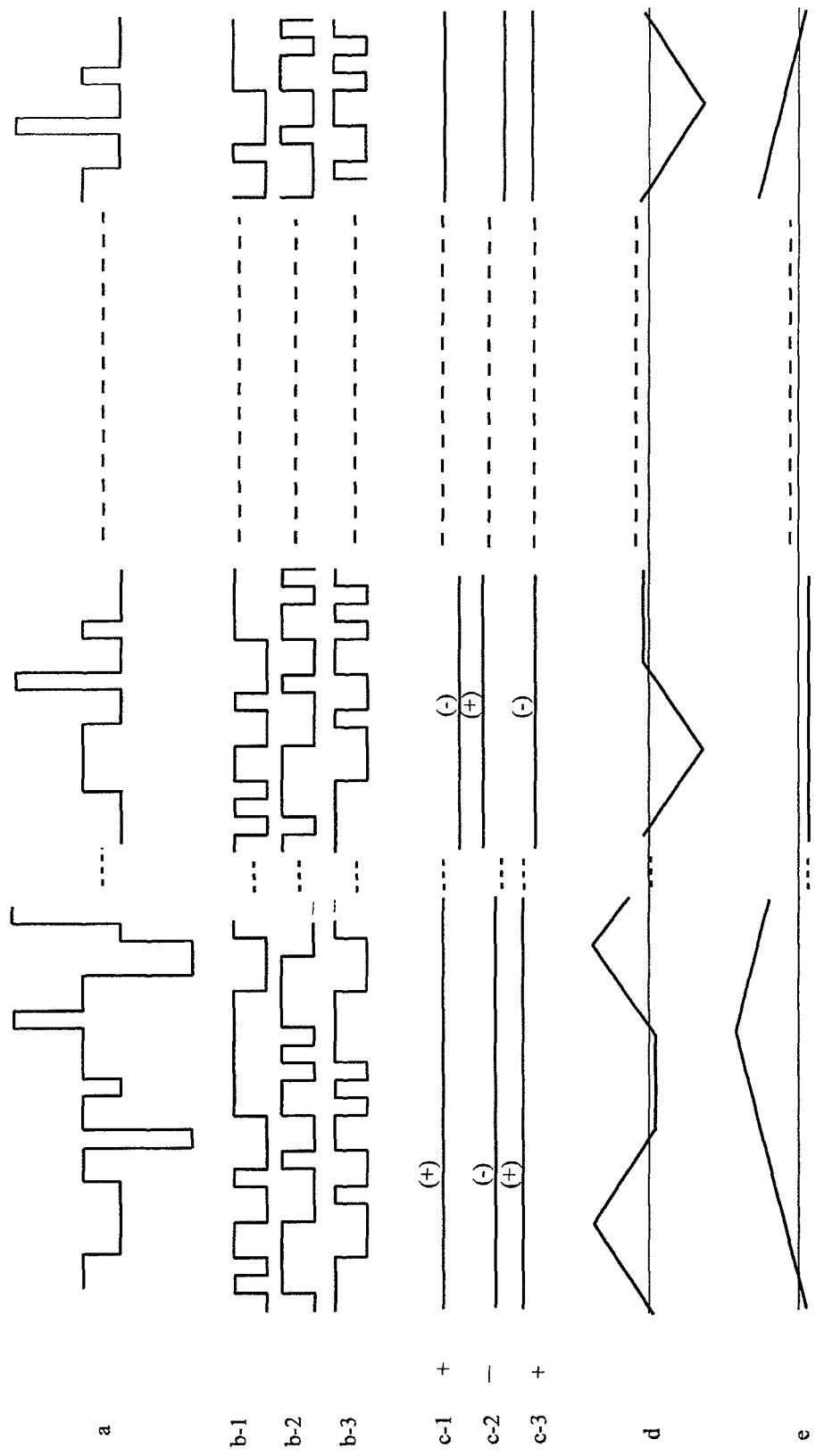
FIG. 6 is an explanatory diagram illustrating a method of detecting the localization pulses in a reception apparatus using the code sequences according to the embodiment of the present invention.

Subsequently, a method of detecting the localization pulses from the thus-acquired multiplexing-spread chip sequence will hereinafter be described with reference to FIG. 6. The symbol "a" in FIG. 6 indicates the multiplexing-spread chip sequence with the code length being "NLNs", which is acquired in the time domain or the frequency domain from the transmission signals generated by the same method as "e" in FIG. 1. For simplifying the explanation, however, the value "k" is set such as k=1. Further, a code sequence "b-1, ... b-3" in FIG. 6 corresponds to the code sequence SC "c-1, ..., c-3" in FIG. 1. In FIG. 6, "a" and "b-1" are synchronized and multiplied, thereby generating "c-1". Similarly, "c-2" is generated from "a" and "b-2", and "c-3" is generated from "a" and "b-3". The symbol "c-1, ..., c-3" represents signals generated by multiplying the chips of the code sequence CC and the chips of the code sequence LC together, and "d" representing the LC is generated in the way of being localized with respect to the code sequence CC. Though not illustrated in FIG. 6, a kr-tuple of multiplexing-spread chip sequences each corresponding to "a" in FIG. 6 are acquired from the transform signals generated by multiplying the k-tuple of transformed multiplexing-spread chip sequences with the multiplicity "r", and all these kr-tuples of multiplexing-spread chip sequences undergo the processing down to the detection of the localization pulses of the code sequence LC. The processing described above is executed with respect to all the multiplexing-spread chip sequences existing in the same chips of the code sequence LC. Moreover, the chip sequence "e" is acquired by localizing the localization pulses with respect to the code sequence LC. Note that these processing methods can be applied to data communications, measurements, etc.

Described next is a data transmission method in the case of the transmission signals containing the data. The data is a binary pulse train generated by applying processing, which contains error correction coding, to inputted source data. The data is transformed into a predetermined format for being mapped to the type of at least any one of the code sequences LC, CC and Sc, the shift time and/or the amplitude.

A case that the transform signals are the multiplexed OFDM signals or the multiplexed Wavelet OFDM signals and the data is mapped to only the determined shift time of the code sequence SC with the code length being "NS", will be described by way of one example. A time width of the chip of the LC is set k-fold as large as a time length of the multiplexing-spread chip sequence, let "k" be the number of the multiplexing-spread chip sequences contained in each chip, let "nd" be the number of the code sequences SC to which the data possessed by the respective multiplexing-spread chip sequences are mapped, let "r" be the multiplicity of the multiplexed OFDM signal or the multiplexed Wavelet OFDM signal, let "LL" be the chip count of the LC having the data-mapped multiplexing-spread chip sequences, and a data quantity (data size) of the data carried by the kNLNS-number of chips has (k×nd×LL×r×log$_2$NS) bits. The data are detected by detecting the shift time of the code sequence SC. Note that this data size is given in the case of equally setting the code sequence count "nd" and the multiplexing-spread chip sequence count "k" with respect to all the multiplexing-spread chip sequences and can be also set differently. Further, the aggregation of the transform signals can be also generated in a way that sets "k", "nd" and "r" to different values per chip of the LC. In the noise environment, it is difficult to detect the specified spread chip sequence from the multiplexing-spread chip sequences, and, if the multiplexing-spread chip sequence has a large multiplicity, it is also difficult to detect the specified spread chip sequence even in a low noise environment because of occurrence of the interference. Therefore, according to the present invention, the SN ratio is improved by detecting the localization pulse, defined as a first localization pulse, of the code sequence CC under a condition enabling the detection of the localization pulses of the code sequence CC, and the code sequence is thus determined. In this process, the code sequences SC and CC are determined by detecting the maximum localization pulse with respect to the CC from the signals given by sequentially multiplying the shift time of the SC for the respective multiplexing-spread chip sequences or by multiplying in parallel the SC having the different shift time, and further the code sequence LC is determined from the CC. Note that the localizing process of the code sequence LC may be omitted by setting the code length of the LC to "1" in this case. Besides, especially with respect to the low noise signals, the transform signals can be generated by use of the multiplexing-spread chip sequences in which the code length NC of the coupling-purpose code sequence (CC) is given such as NC=1, while the code length NL of the LC is a required code length, or these code lengths are given such as NC=1 and NL=1. On the other hand, if it is difficult to detect the localization pulses of the CC, each code sequence is determined by detecting and deciding the localization pulse, defined as a second localization pulse, of the LC, with the localization pulses of the CC serving as the chip sequence of the LC. It should be noted that "the determination of the code sequence" connoted in the present invention implies determining the shift time of the code sequence and/or the polarity in the transmission signals using the known code sequence, and includes determining the type of the code sequence, the shift time and/or the polarity in the transmission signals using an unknown code sequence. The data are calculated by converting, into a reverse format, the data expressed in terms of the determined code sequence, the determined shift time of the code sequence and/or the determined polarity, and subsequently the source data are decoded from the calculated data. Note that the OFDM signals or the Wavelet OFDM signals of the multiplexing-spread chip sequences, of which the chips are mapped to multi-valued PSK (Phase Shift Keying), PAM (Pulse Amplitude Modulation), ASK (Amplitude Shift Keying), etc in the order of the multiplexing-spread chip sequences, represent the multiplexing-spread chip sequences in the frequency domain and are directly de-spread in the SC.

Further, the code sequence Sc is configured as $2^k$-types of code sequences with which k-bit data are associated, whereby the speed-up scheme can be attained by use of this Sc. Moreover, a further speed-up scheme can be attained by mapping the data to the shift time of the Sc and/or the polarity. In this case, by way of one method of restraining the types of the code sequences from increasing, the spread chip sequences can be configured and multiplied with respect to each Sc by employing a combination of the plurality of SCs to which the polarity is given. Furthermore, the data can be mapped also to the CC and/or the LC.

Next, A measuring method according to the present invention will be described. The transmission signal is generated from the determined transform signal on the transmission side or from the plurality of transform signals, which are switched over in a predetermined procedure, and are then transmitted. The thus-generated transmission signals include the modulation signals generated by modulating the carrier waves with any one of the multiplexing-spread chip sequence and the impulse train thereof, the hopping signals generated by modulating the hopping carrier waves, the multiplexed OFDM signals and the multiplexed Wavelet OFDM signals generated by multiplexing the OFDM signals and the Wavelet OFDM signals that are generated from the multiplexing-spread chip sequences and are orthogonal in the frequency domain, the modulation signals and orthogonal modulation signals generated by modulating the carrier waves with the signals that are orthogonal in the frequency domain or with the multiplexed signals thereof, or the hopping signals generated by modulating the hopping carrier waves, however, the signal types are not limited to those described above. The transmitted signals are, after undergoing action such as being reflected, absorbed, dispersed and diffracted by the target object, detected as transmitted signals, fluorescent radiation signals, black body radiation signals or reflected signals, and information on the target object can be acquired from the detected signals. Moreover, such a configuration can be taken that distances between the transmission apparatus for the measurement, the target object and the reception apparatus for the measurement and information on a medium are acquired by detecting the transmission signals. Further, it is feasible to measure a control result of a state, e.g., a quantum state of the target object while controlling or by controlling the state of the target object in a way that uses a part or the whole of the transmission signals.

Working Example

Figure 7:
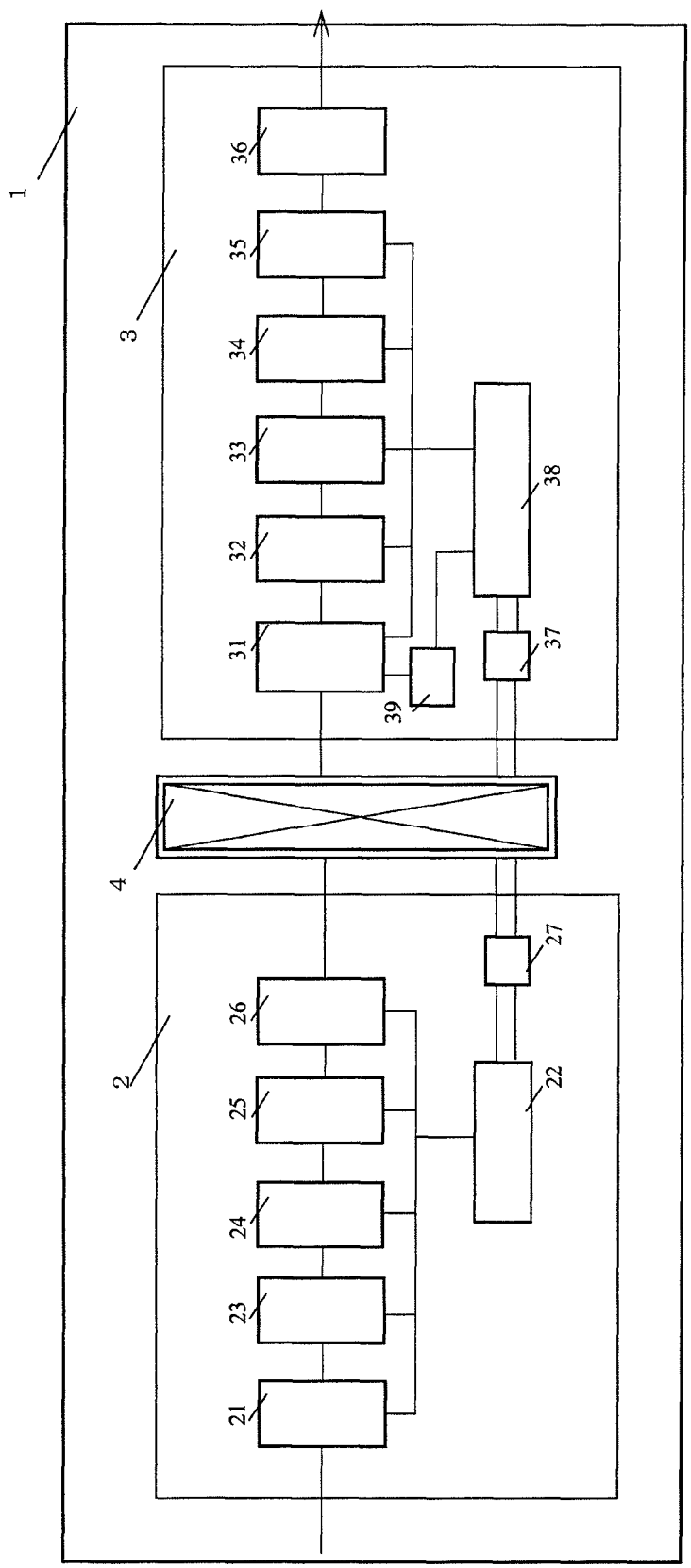
FIG. 7 is an explanatory diagram illustrating a communication system using the code sequences according to the embodiment of the present invention.

FIG. 7 illustrates an example of a configuration of a transmission system using the code sequences according to the present invention, and a transmission system 1 using the code sequences includes a transmission apparatus 2, a receiver 3 and a switching means 4. The transmission apparatus 2 includes an input means 21, a multiplexing-spread signal generating means 23, a transforming means 24, a transmission-purpose signal generating means 25, a transmitting means 26, a control means 22, and a communication means 27 for performing communications with the switching means 4 and/or the reception apparatus 3, in which the respective means are controlled by the control means 22 in the way of being synchronized with clocks. On the other hand, the reception apparatus 3 includes a transmission signal detecting means 31, a transform signal processing means 32, a detection enabling means 33, a determining means 34, a decoding means 35, a display/output means 36, a communication means 37 for performing the communication with the switchboard 4 and/or the transmission apparatus 2, a control means 38 and a synchronization detecting means 39, in which the respective means are controlled in the way of being synchronized with the clocks of the control means 38. The synchronization detecting means captures the synchronization of the detected transmission signal, estimates a line status by employing a pilot signal and can eliminate cyclic noises by detecting and predicting the noises.

Figure 8:
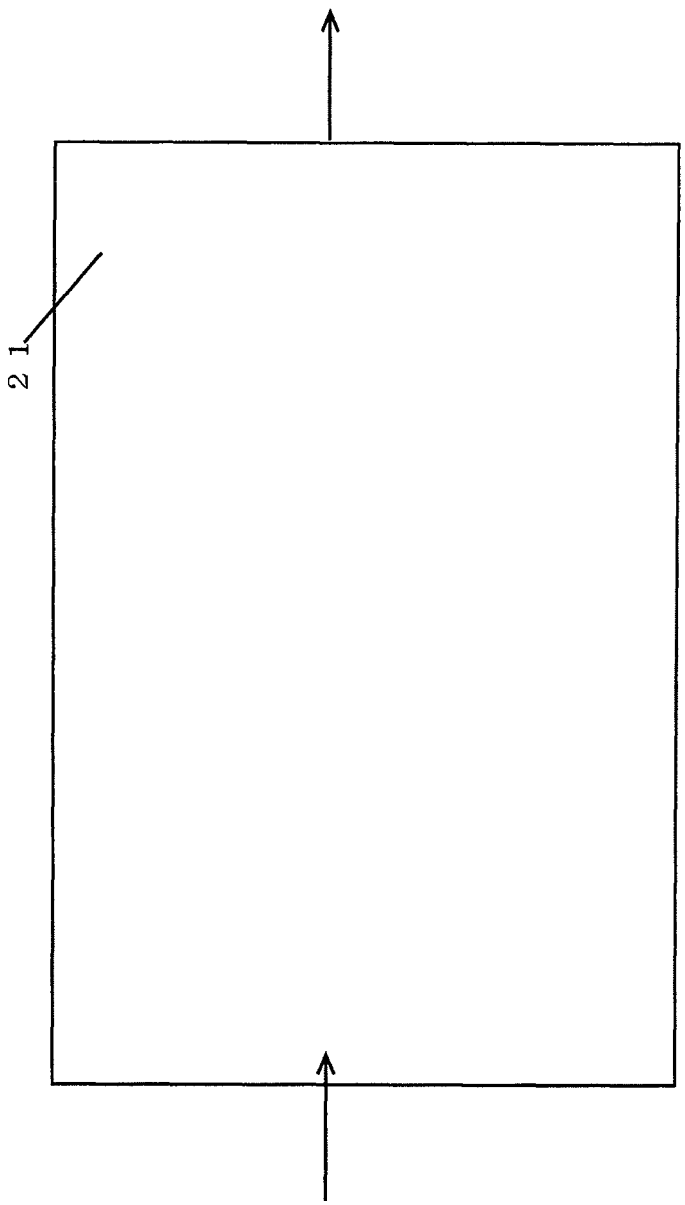
FIG. 8 is an explanatory diagram illustrating an input means in the transmission apparatus of the communication system using the code sequences according to the embodiment of the present invention.

FIG. 8 illustrates the input means 21. The input means 21 generates the data by applying a scrambling process, a Reed-Solomon coding process, a convolution arithmetic process, a puncturing process, an interleaving process, a parity checking process, etc to the source data. Note that the processes applied to the source data are not limited to those described above but can be added, deleted and changed corresponding to communication environments.

Figure 9:
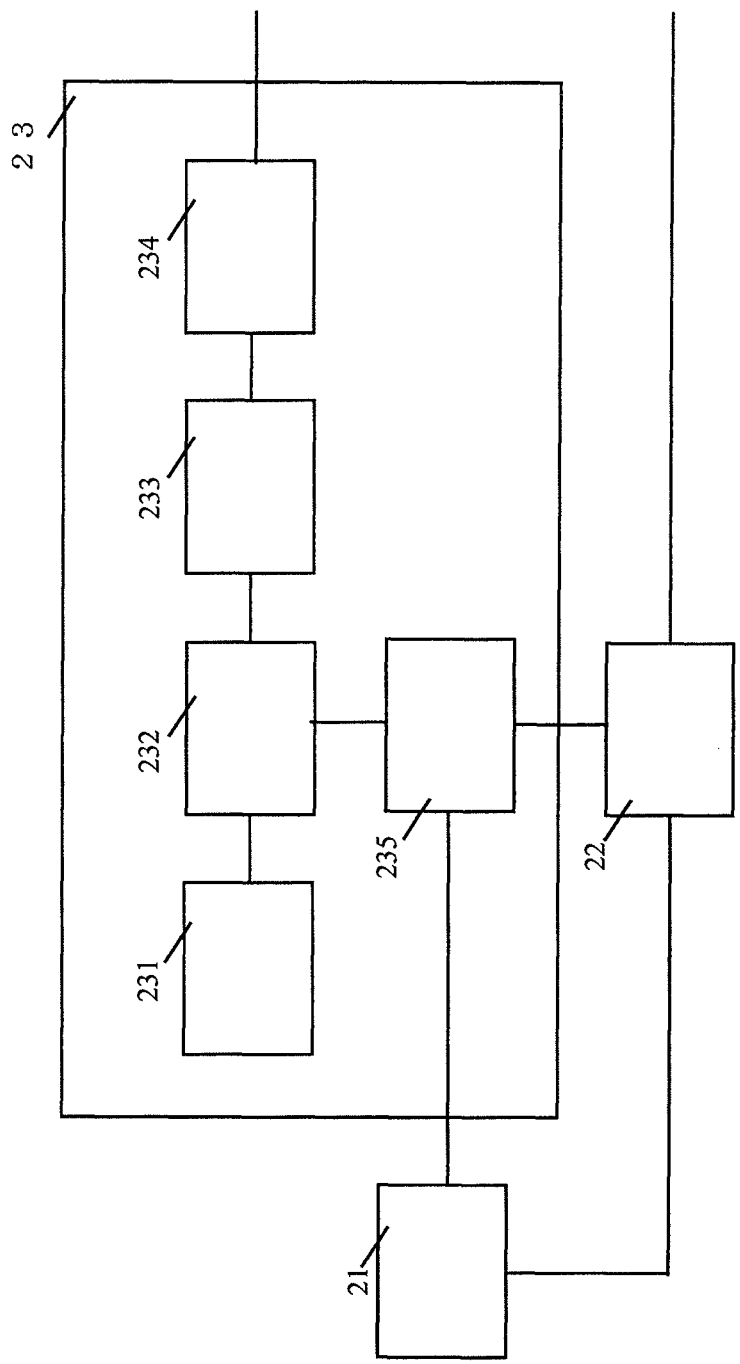
FIG. 9 is an explanatory diagram illustrating a multiplexing-spread signal generating means in the transmission apparatus of the communication system using the code sequences according to the embodiment of the present invention.

FIG. 9 depicts the multiplexing-spread signal generating means 23. A code sequence generating unit 231 generates a basic-status LC for "a" in FIG. 1, a basic-status CC for "b-1 through b-3" therein and a basic-status SC for "c-1 through c-3" therein by use of the given basic statuses of the respective code sequences, which are stored in, e.g., a memory (unillustrated). On the other hand, the data can be mapped to, generally, all of the code sequences SC, CC and LC. Therefore, for instance, let "VC" and "LL" be a chip count of the CC and a chip count of the LC respective, and a data format converting unit 235 converts the format into NS-ary (VC×LL) digit format. Particularly in the case of the "VC" being "1", a digit count is LL digits. Then, a data mapping unit 232 maps the data of which the format is converted into a required code sequence, whereby the chip sequences "c-1 through c-3" in FIG. 1 or the chip sequences "c-1 through c-3" in FIG. 2 are generated. A multiplying unit 233 multiplies the chips of the SC and the CC by the chips of the LC in a way that uses the chip sequences generated by the data mapping unit 232, thereby generating the required spread chip sequences "d-1 through d-3" in FIG. 1 or the required spread chip sequences "d-1 through d-3" in FIG. 2. Subsequently, a multiplexing unit 234 multiplexes the spread chip sequences generated by the multiplying unit 233, thereby generating the multiplexing-spread chip sequence "e" in FIG. 1 or FIG. 2.

Figure 10:
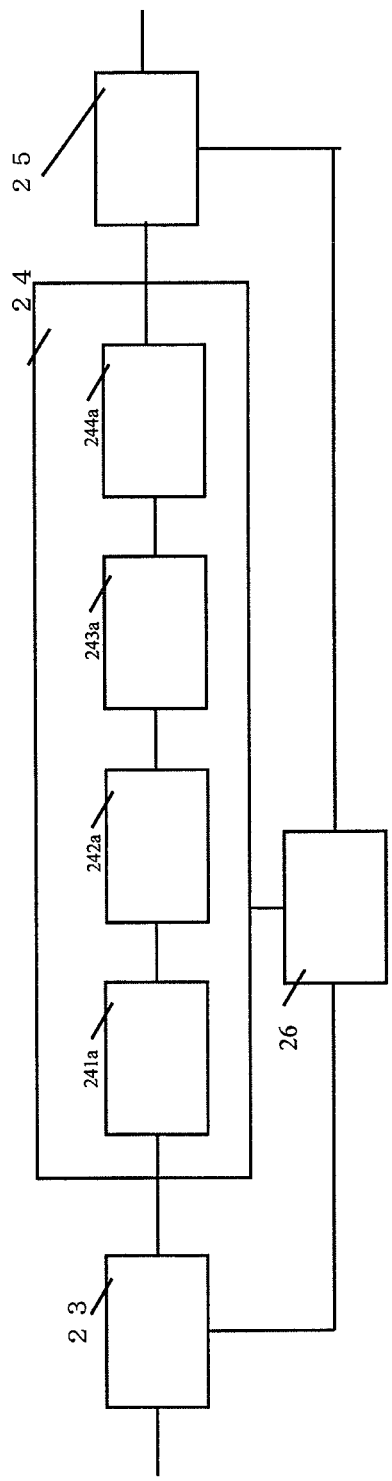
FIG. 10 is an explanatory diagram illustrating a transforming means for generating multiplexed OFDM signals in the transmission apparatus of the communication system using the code sequences according to the embodiment of the present invention.

FIG. 10 illustrates the transforming means 24 for generating the OFDM signals. A required number of multiplexing-spread chip sequences are, after being series/parallel-transformed, mapped by a mapping unit 241a and are IDFT-processed by an IDFT unit 242a, thereby generating the OFDM signals. This process is repeated an r-number of times equivalent to the multiplicity of the transform signal in a manner that changes the frequency division method, and the r-tuple of generated OFDM signals are multiplexed by a multiplexing unit 234a, thereby generating the multiplexed OFDM signals defined as the transform signals ("r" is a natural number). Subsequently, a GI inserting unit 244a inserts guard intervals GI into these multiplexed OFDM signals, and the signals with the guard intervals GI are output as the actual signals or the complex signals to the transmission-purpose signal generating means 25. The method of inserting the guard intervals GI into the OFDM signals is a method known to those skilled in the art.

The transmission-purpose signal generating means 25 in FIG. 10 attaches the preamble to an anterior part and/or the postamble to a posterior part of the transform signal with the guard interval GI being inserted, however, the signal attached by the transmission-purpose signal generating means 25 is not limited to that described above.

Figure 11:
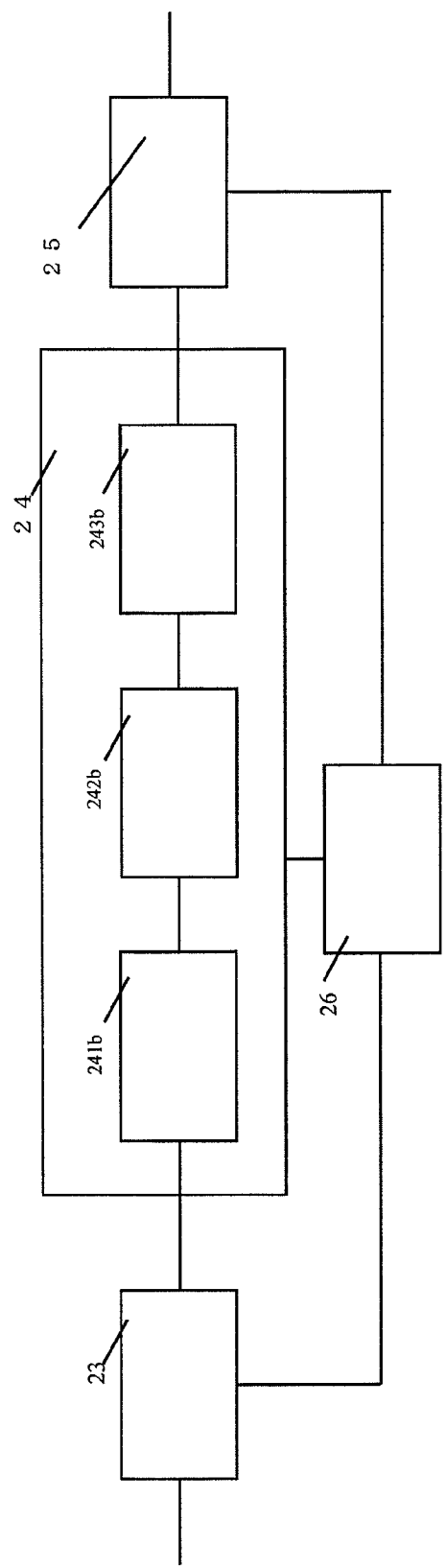
FIG. 11 is an explanatory diagram illustrating the transforming means for generating multiplexed Wavelet OFDM signals in the transmission apparatus of the communication system using the code sequences according to the embodiment of the present invention.

FIG. 11 illustrates the transforming means for the Wavelet OFDM signals. The required number of multiplexing-spread chip sequences given by "e" in FIG. 1 or FIG. 2 are, after being series/parallel-transformed, mapped by an IDWT mapping unit 241b and are IDWT-processed by an IDWT unit 242b, thereby generating the Wavelet OFDM signals given in "b-1 through b-r" in FIG. 5. This process is repeated the r-number of times equivalent to the multiplicity of the transform signal in a manner that changes the parameter setting, then the r-tuple of generated Wavelet OFDM signals are multiplexed by an IDWT multiplexing unit 234b, and the multiplexed Wavelet OFDM signals defined as the transform signals are thereby generated and are output as the actual signals or the complex signals to the transmission-purpose signal generating means 25.

The transmission-purpose signal generating means 25 in FIG. 11 attaches the preamble to the anterior part and/or the postamble to the posterior part of the transform signal, however, the attachment-enabled signal is not limited to that described above.

An output signal of the transmission-purpose signal generating means 25 is inputted to the transmitting means 26, in which the transmission signal is generated and then transmitted. In this example, the transmission signals are transmitted to the reception apparatus via the switching device 4, however, in a data transmission system configured not to use the switching device 4, the transmission signals are transmitted directly to the reception apparatus.

Figure 12:
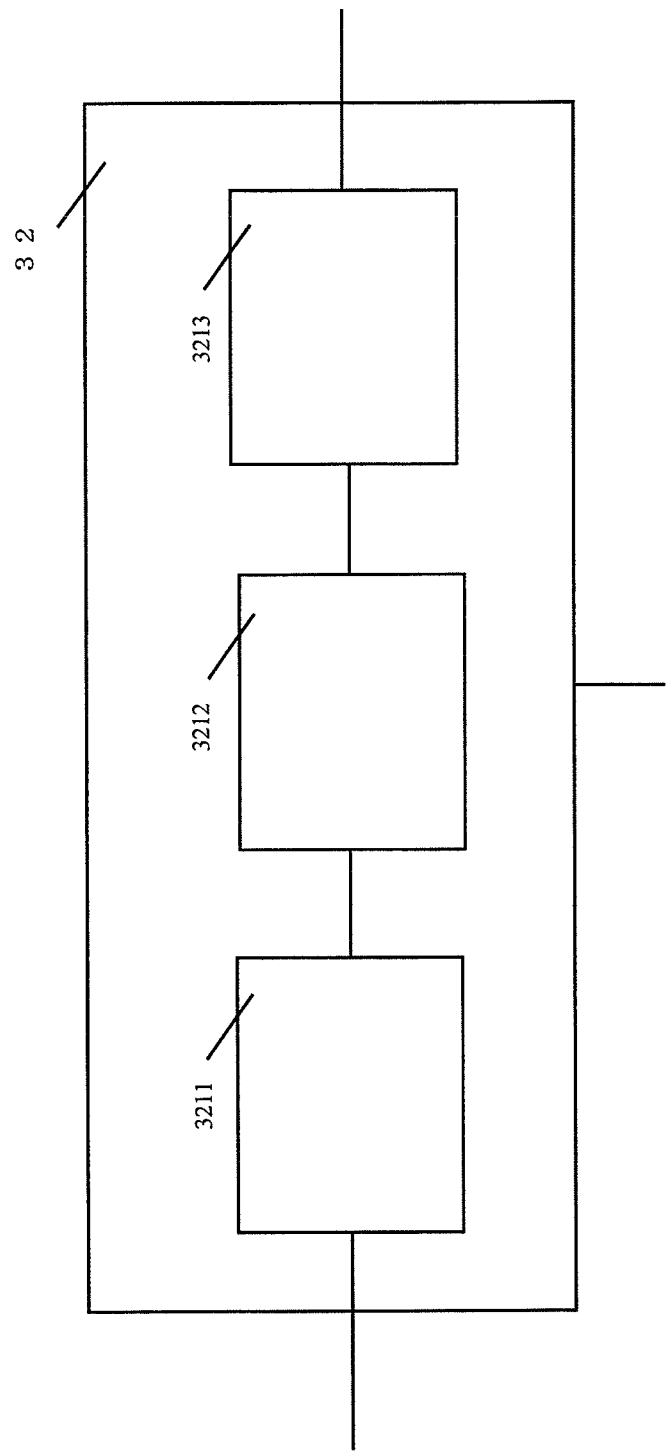
FIG. 12 is an explanatory diagram illustrating a transform signal processing means for the multiplexed OFDM signals in the reception apparatus of the communication system using the code sequences according to the embodiment of the present invention.

FIG. 12 illustrates the transform signal processing means 32 of the reception apparatus 3 which receives such a type of transmission signals that the transform signals are the multiplexed OFDM signals having the multiplicity being equal to or larger than "1". The guard intervals GI of the transform signals detected from the transmission signals by the transmission signal detecting means 31 are removed by a GI removing unit 3211 of the transform signal processing means 32, the transform signals are DFT-transformed into the frequency domain by a DFT unit 3212, then a DFT multiplexing-spread chip sequence acquiring unit 3212 acquires the components of the respective chip points of the frequency domain on the basis of the expression (3), and the multiplexing-spread chip sequences are acquired from these components.

Figure 13:
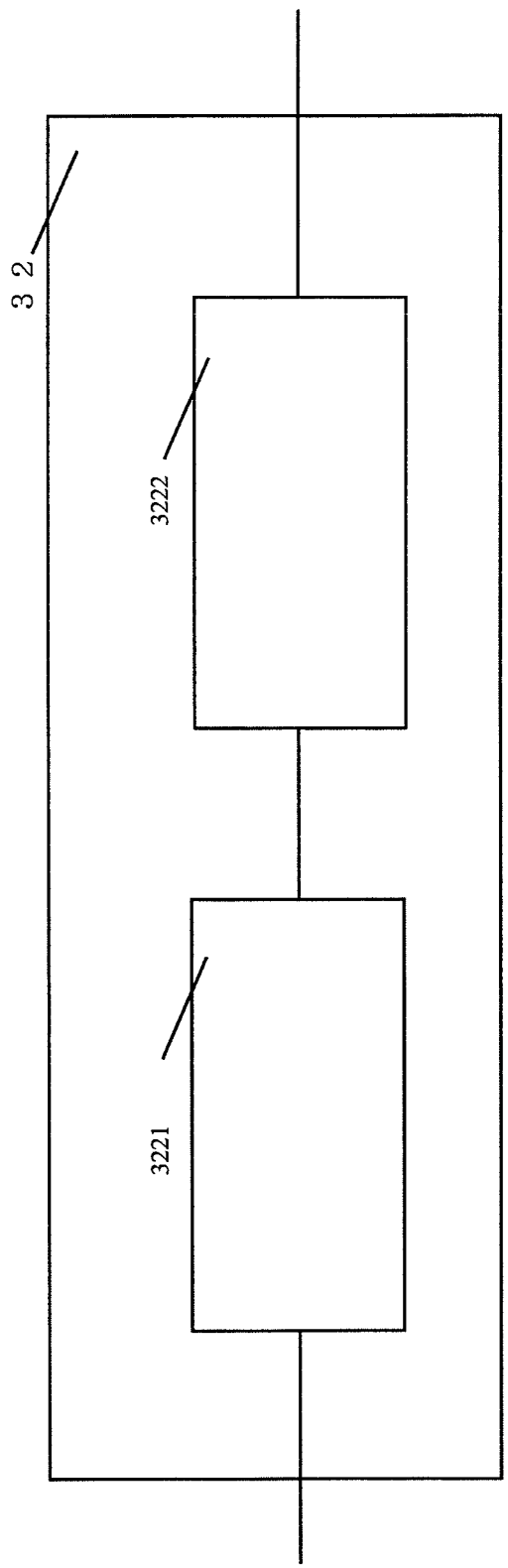
FIG. 13 is an explanatory diagram illustrating the transform signal processing means for the multiplexed Wavelet OFDM signals in the reception apparatus of the communication system using the code sequences according to the embodiment of the present invention.
Figure 18:
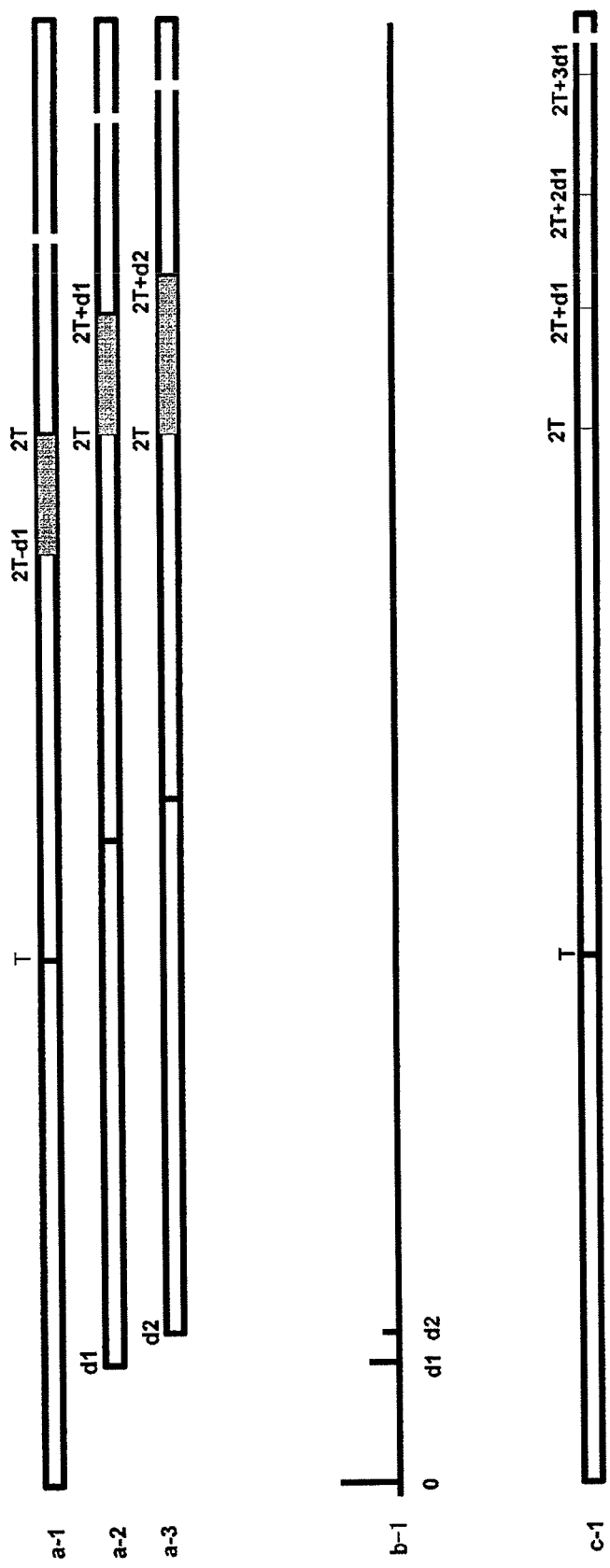
FIG. 18 illustrates a method of removing a delay wave superposed on the transmission signal by use of the code sequence in a preamble in place of removing the delay wave by use of a guard interval GI.

FIG. 18 depicts a method of deleting delay waves superposed on the transmission signals by using the code sequence as the preamble in place of removing the delay waves through the use of the guard intervals GI. In the working example, this delay wave removing method is used for a case of attaining the speed-up scheme by reducing a symbol length in the communications using the Wavelet OFDM signals and for a case of attaining the speed-up scheme by deleting the guard intervals GI in the communications using the OFDM signals, and the transform signal processing means 32 in FIG. 13 is used to remove the delay waves caused due to multi-paths by exploiting the large improvement rate of the SN ratio.

A symbol "a-1" in FIG. 18 indicates the transmission signal, in which the preamble contains two cycles of the code sequences each having a cycle "T", and subsequently a pulse train or the transform signal representing another item of information is disposed. The M-sequence is preferable as the code sequence because only the M-sequence has a peak of an autocorrelation function, and a length thereof may be equal to or larger than the two cycles.

A symbol "a-2" represents the delay wave of the transmission signal delayed by a period of time "d1", in which a pulse train "2T+d1" from the time "2T" is equal to a portion of "2T" from "2T+d1" of the waveform of "a-1". A symbol "a-3" represents the delay wave of the transmission signal delayed by a period of time "d2", in which a pulse train "2T+d2" from "2T" is, though not illustrated, equal to a portion of "2T" from "2T+d2" of the transmission waveform. Though not depicted in the drawing, a reception wave is what these delay wave caused due to the reflection etc are superposed on the transmission signal.

A symbol "b-1" represents a correlation function between the reception wave generated by superposing the delay waves of "a-2" and "a-3" on the transmission signal of "a-1" and the code sequence. In "b-1" illustrated in FIG. 18, a pulse of the correlation function of the transmission signal, a pulse of the correlation function of the delay wave of the delay time "d1" and a pulse of the correlation function of the delay wave of the delay time "d2" are generated at the time "0", the time "d1" and the time "d2", respectively. Amplitudes of these pulses indicate strengths of the transmission signal and the delay waves, respectively.

A symbol "c-1" indicate a waveform shaped by removing the delay wave from the reception wave. Since the pulse train from a time section of "2T-d1" through "2T" of the transmission signal due to a first delay wave and the pulse train from a time section of "2T-d2" through "2T+d1-d2" of the transmission signal due to a second delay wave are superposed in a time section "D1" of "2T through "2T+d1" of the reception signal, the localization pulse is acquired by calculating the correlation function between the reception wave and the code sequence, and the transmission signal of "c-1" in the time section D1 with the delay wave being removed is detected by subtracting the delay wave at each time with the amplitude being corrected by use of the delay time and the amplitude of the pulse from the time section of "2T" through "2T+d1" of the reception wave.

In a time section D2 of "2T+d1" through "2T+2d1" of the reception signal, amplitudes and periods of delay time of a first delay wave consisting of the pulse train of the time section of "2T" through "2T+d1" of a transmission signal "a-1" and of a second delay wave consisting of the time section of "2T+d1-d2" through "2T+2d1-d2" of the transmission signal, are corrected based on the correlation function and then removed, and a transmission signal "c-1" of the time section D2 with the delay waves being removed is detected.

Hereafter, similarly, the transmission signal of "c-1" is detected by removing the delay waves from a time section Dn of "2T+(n−1)d1" through "2T+nd1" of the reception signal.

The transmission signal of "c-1" undergoes the de-spreading process and subsequently the localizing process, then the shift time of the spreading-purpose code sequence is detected, and the data is calculated.

In what has been described above, the code sequence disposed in the preamble may be sent as the pulse train and may also be transformed into a sine wave or a cosine wave, a Wavelet pulse, etc and thus transmitted. Especially in the Wavelet OFDM and in the OFDM, these waveforms are generated on per a sub-channel basis and transmitted, while on the reception side the waveforms are detected on the per sub-channel basis, alternatively the waveforms are series/parallel-transformed and allocated to the sub-channels, the Wavelet OFDM signals or the OFDM signals are generated and transmitted, and the detected waveforms are parallel/series-transformed on the reception side, thereby enabling the multiplexing-spread chip sequence to be acquired. Further, the transform signals include a Fourier transform signal, an impulse train, a sub-channel signal of the Wavelet OFDM signals and a sub-channel signal of the OFDM signals, however, the transform signals are not limited to those described above. Particularly in the transform signals consisting of the Wavelet OFDM signal and the OFDM signal, the delay wave is removed by the method illustrated in FIG. 18 on the per sub-channel basis, or alternatively the delay wave of the channel may also be removed by use of an interpolated value based on the delay wave of a specified channel or the signal with the delay wave being removed.

FIG. 13 illustrates the transform signal processing means 32 of the reception apparatus 3 which receives such a type of transmission signals that the transform signals are the multiplexed Wavelet OFDM signals having the multiplicity being equal to or larger than "1". The transform signal detected from the transmission signals by the detecting means 31 is DWT-transformed by a DWT unit 3221, components of the respective chip points in the frequency domain are acquired based on the expression (3) by a DWT multiplexing-spread chip sequence acquiring unit 3222, and the respective multiplexing-spread chip sequences depicted in "e" in FIG. 5 are acquired from these components.

Figure 14:
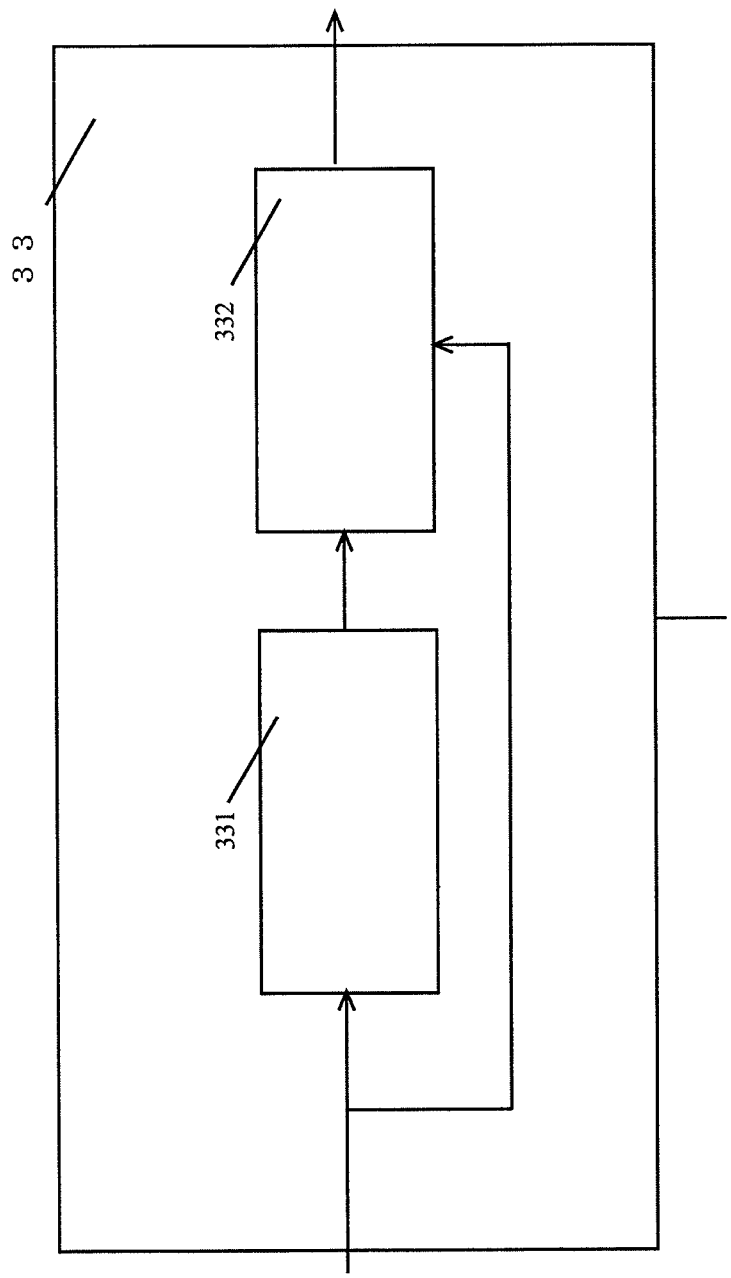
FIG. 14 is an explanatory diagram illustrating a detection enabling means in the reception apparatus of the communication system using the code sequences according to the embodiment of the present invention.

FIG. 14 illustrates the detection enabling means 33 according to the present invention. An output signal of a de-mapping unit 331 is multiplied by the SC and de-spread by the de-spreading unit 332, however, in the case of the mapping-applied signals such as the multi-valued PSK, PAM and ASK in the order of the chips of the multiplexing-spread chip sequence, the output signal of the transform signal processing means 32 represents the multiplexing-spread chip sequence, and hence the de-spreading unit 332 can directly de-spread the output signal of the transform signal processing means 32 with the SC. Note that the spread chip sequence having undergone de-spreading is in a detection-enabled status in which the localization pulses of the CC can be detected. The term "localization" connoted in the present invention implies calculating the correlation function between the signals including the code sequence and the code sequence or detecting these signals by a matched filter (Matched Filter) configured by the code sequences.

Figure 15:
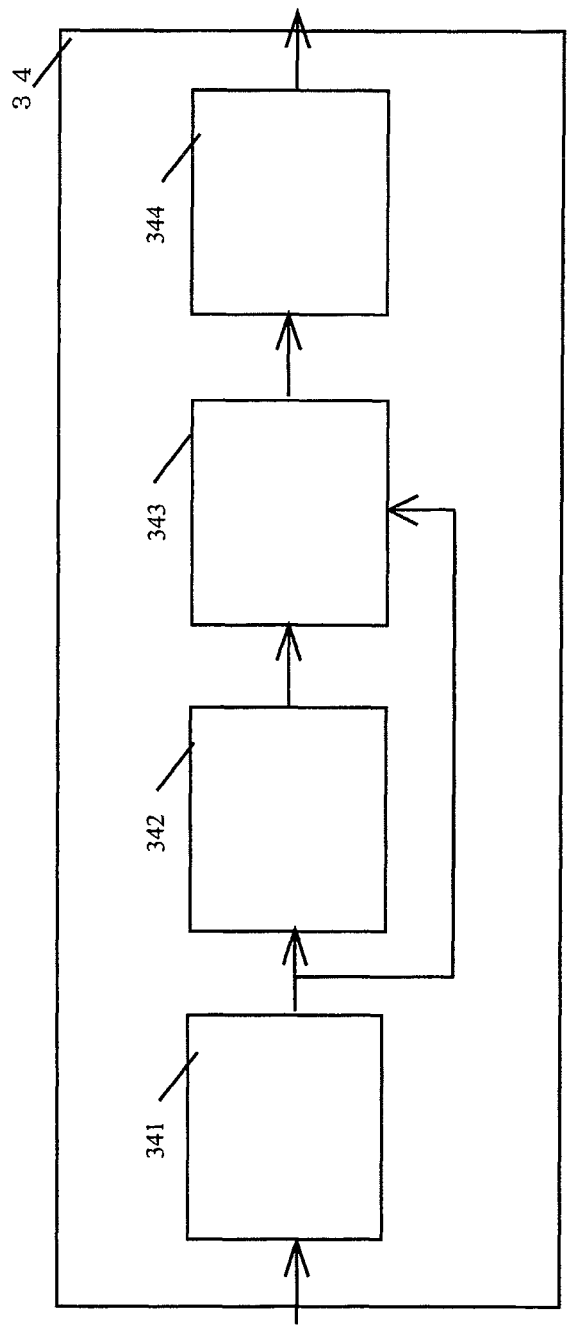
FIG. 15 is an explanatory diagram illustrating a determining means in the reception apparatus of the communication system using the code sequences according to the embodiment of the present invention.

FIG. 15 illustrated the determining means 34. An output signal of the detection enabling means 33 is localized with respect to the CC by a first localizing unit 341 and inputted to a second localizing unit 342, a peak of this output signal is detected by a peak detection unit 343, subsequently a determining unit 344 determines the CC by deciding a maximum peak, and the SC and the LC are determined based on a result thereof. While on the other hand, if the determining unit 344 cannot decide the maximum peak of the output signal of the first localizing unit 341, the second localizing unit 342 generates a localization signal with respect to the LC from the output signal of the first localizing unit 341, the peak detection unit 343 detects the peak of the localization signal, subsequently the determining unit 344 determines the LC by deciding the maximum peak, and then the SC and the CC are determined. In particular, if the shift time of the SC for de-spreading is coincident with the shift time of the SC of the output signal of the transform signal processing means 32, a peak of the localization pulse of the CC and a peak of the localization pulse of the LC reach their maximum peaks, and hence the determination of the Sc is made based on determining the CC or the LC.

Herein, a localization pulse fast detection method implemented by the determining means 34 is exemplified. This detection method involves de-spreading the signals including the multiplexing-spread chip sequences by scanning the shift time of the Sc, calculating the localization signals from the signals being de-spread, detecting the maximum localization pulse and thus determining the shift time of the SC. Note that each time the detection enabling means 33 executes the de-spreading process, the determining means 34 may calculate the localization signal by this technique.

For facilitating the explanation, the localizing-purpose code sequence (LC) in FIG. 1 shall be one sequence consisting of an M-sequence "XL" with a code length "NL" being given by "NL"=7, which is expressed by the expression (4).

[Mathematical Expression 4]

$$XL=(1,1,1,-1,-1,1,-1) \quad (4)$$

Further, the coupling-purpose code sequence (CC) shall be a pulse train with the code length NC=1 and shall also be a code sequence containing "+1" arranged for 7 chips of the LC.

Moreover, the spreading-purpose code sequence (SC) shall be an M-sequence "XS" with the code length NS=7, in which a standard status is that the data is "0" concurrently with respect to 7 sequences corresponding to the chips of the LC, this M-sequence "XS" being expressed by the expression (5).

[Mathematical Expression 5]

$$XS=(1,1,1,-1,-1,1,-1) \quad (5)$$

At this time, seven chips ($CL_1$, $CL_2$, $CL_3$, $CL_4$, $CL_5$, $CL_6$, $CL_7$) of "XL" are given in "a" of FIG. 1. For simplifying the explanation, in "b-1", all the chips ($CC_{(1,1)}$, $CC_{(2,1)}$, $CC_{(3,1)}$, $CC_{(4,1)}$, $CC_{(5,1)}$, $CC_{(6,1)}$, $CC_{(7,1)}$) are set as "+1", and the multiplicity of the multiplexing-spread chip sequence of each chip of the LC is set to "1". Furthermore, the code sequence "c-1" is a spread code sequence ($CS_{(1, j, 1)}$, $CS_{(1, j, 2)}$, $CS_{(1, j, 3)}$, $CS_{(1, j, 4)}$, $CS_{(1, j, 5)}$, $CS_{(1, j, 6)}$, $CS_{(1, j, 7)}$) (j=1, . . . , 7) with the data being mapped to the shift time of "XS", in which the value "k" is set such as k=1. The code sequence "d-1" is a code sequence generated by taking the synchronization among "a", "b-1" and "c-1" and applying the multiplication thereto, and, in this example, the multiplexing-spread chip sequence of the chip of each LC is defined as a binary pulse train equal to the spread code sequence XS, having the polarity coincident with the polarity of the chip concerned, to which the data are mapped. The code sequence "e" in FIG. 1 is a pulse train consisting of "d-1".

In FIG. 6, the multiplexing-spread chip sequence "a" is a multiplexing-spread chip sequence of which the multiplicity given in "e" of FIG. 1 is "1", and is, in this example, configured so that the shift time of the spread code pulse train expressed by the expression (5) is determined based on the data and the polarity thereof is coincident with the polarity of the chip of the LC. The execution of the de-spreading process is applied to this signal by making the multiplication in a way that changes the shift time of the spread code sequence "XS" expressed by the expression (5) prepared in the reception apparatus from "0" through "6" per chip of the LC, thereby generating the de-spreading signal given in "c-1" of FIG. 6. Though not illustrated, seven tuples of de-spreading signals of each chip are generated.

The processing being performed as above, the localization signals with respect to the LC are calculated by employing the seven tuples of de-spreading signals for each of the 7 chips of the LC, and periods of shift time of the seven spread code sequences "XS" are determined in the way of detecting the maximum pulse thereof, thereby acquiring septenary 7-digit data. In the signals that are spread by the SC in which the same data are mapped to some determined chips of the LC, an independent chip count decreases, and hence the number of times of operation for the de-spreading process and the localizing process is reduced.

While on the other hand, in place of calculating the localization pulses related to the localizing-purpose code sequence by use of all the de-spreading signals, detection values of the respective de-spreading signals are grouped and added respectively, the localization signals are generated by localizing the added values with respect to the localizing-purpose code sequence, the maximum localization pulse is detected from the localization signals, a sum-tuple of de-spreading values for giving the maximum localization pulse is determined, subsequently the detection values of the de-spreading signals structuring the sum-tuple are respectively grouped and added, the localization signals for the localizing-purpose code sequence are calculated from the added values thereof, the sum-tuple for giving the maximum value is calculated by detecting the maximum value thereof, and values of the de-spreading signals serving as components thereof are determined. Hereafter, similarly, the de-spreading signals structuring the sum-tuple for giving the maximum values are sorted out and then added, and the sum-tuple for giving the maximum localization pulse value is thus determined, which process is repeatedly executed to determine the shift time of the spread code sequence corresponding to each chip, thereby acquiring the data.

Note that the expression (4), as described above, represents the localizing-purpose code sequence "XL" consisting of the M-sequence having the code length "7", which is expressed by XL=(1, 1, 1, −1, −1, 1, −1). Furthermore, the expression (5) represents the spread code sequence "XS" consisting of the M-sequence having the code length "7", which is expressed by XS=(1, 1, 1, −1, −1, 1, −1) in the basic status with the data being "0". The shift time of this spread code pulse train can be set to an arbitrary value of "0" through "6" according to the data. Moreover, the code length of the coupling code sequence CC is set to "1", the multiplicity of the spread code sequence is set to "1", and the amplitude is set to "+1". Further, the code sequences "XL" and "XS" may be different types of code sequences. Furthermore, the code sequence "XS" can be structured by the same code sequence, the different code sequence or the determined code sequence on the per chip basis of the XL. Note that the code sequences used for the LC and the SC are not limited to the M-sequences but can involve using the Gold code sequence, the Kasami code sequence, etc.

The values of the de-spreading signals obtained by the de-spreading process in the first, second, third and sixth chips of the localization code sequence are values Aq (q=1, 2, 3, 6) expressed by the following expression (6).

[Mathematical Expression 6]

$$A1 = A2 = A3 = A6 = (7, -1, -1, 1, -1, -1, -1) \quad (6)$$

Further, the values Ak (k=4, 5, 7) of the de-spreading signals of the fourth, fifth and seventh chips of the localization pulse train are values obtained by inverting the codes of the respective elements of "A1". The polarity of Ak (k=4, 5, 7) are converted into plus and added to the maximum localization pulse value related to the LC, and therefore the following description will be made on the assumption such as AL=A1 (L=1, ..., 7). Note that it is assumed in the following discussion that the necessary items of data are to be stored in the memory etc.

The chips of the AL are sorted out, e.g., as follows and stored.

$aL=(7,-1,-1,-1)$ and $bL=(-1,-1,-1)$, or $cL(-1,-1,-1,-1)$ and $dL=(7,-1,-1)$.

Values of aL, bL, cL and dL are added, and the added values are calculated such as:

$aL_{sum}=7-1-1-1=4$, $bL_{sum}=-1-1-1=-3$, $cL_{sum}=-1-1-1-1=-4$, $dL_{sum}=7-1-1=5$.

A case of a differential process of calculating the localization pulses by using "$aL_{sum}-bL_{sum}=7$" and "$cL_{sum}-dL_{sum}=9$" will hereinafter be described.

[Mathematical Expression 7]

$$\Phi k = (NL - k)(aL_{sum} - bL_{sum}) + k(cL_{sum} - dL_{sum}) \quad (7)$$
$$= 7(7 - k) + 9k$$

The expression (7) expresses a maximum localization pulse $\Phi k$ (k=0, ..., 7) in the differential process in the case of letting "k" be a number given by "$cL_{sum}-dL_{sum}$". In the case of detecting the maximum localization pulse given by "$\Phi k=49$" where k=0, the following process is executed. To be specific, tuples of "$aL_{sum}-bL_{sum}=7$" are selected with respect to all the chips of the LC, and the chips "aL" are sorted out such as:

$aL1=(7,1)$, and $aL2=(-1,-1)$.

The respective added values are calculated as follows:

$aL1_{sum}=7-1=6$, $aL2_{sum}=-1-1=-2$

Then, a calculation of "$aL1_{sum}-aL2_{sum}=8$" is made. In this case, the maximum localization pulse value $\Phi 00$ is given by "8×7=56", and "aL1" is selected.

The chips "aL1" are further sorted out, and calculations are respectively performed such as aL11=7, aL12=−1, $aL11_{sum}=7$, $aL12_{sum}=-1$, and $aL11_{sum}-aL12_{sum}=8$, whereby the maximum localization pulse value becomes "56". As a result, "aL11 (L=1, ..., 7) is selected, all periods of shift time of the respective SCs corresponding to the chips of the LC become "0", and the septenary 7-digit data (0, 0, 0, 0, 0, 0, 0) are determined.

In the case only "cL" and "dL" and the case of a mixture of "aL", "bL", "cL" and "dL", the shift time is calculated by detecting the maximum localization pulse about the localizing-purpose code sequence, thereby enabling the data to be determined.

In place of calculating the maximized localization pulse by using the difference between each tuple of added values, the shift time is similarly calculated by detecting the maximum localization pulse about the localizing-purpose code sequence in a way that uses each tuple of added values, whereby the data may thus be determined. The code length of each of the LC and the SC is "7", while the code length of the CC is "1" according to the present invention, in which case an arithmetic quantity for detecting the localization pulses is, by way of one example, approximately 4/10,000 as small as the method of comparing all the statuses. Note that the localization signals are calculated by multiplying all the differential values by "+" and "−", and the maximum pulse thereof is determined to be the maximum localization pulse according to the method described above, however, if the differential value is a determination-enabled SN ratio, the positive and the negative thereof are determined, whereby the number of times of the operation can be decreased.

Figure 19:
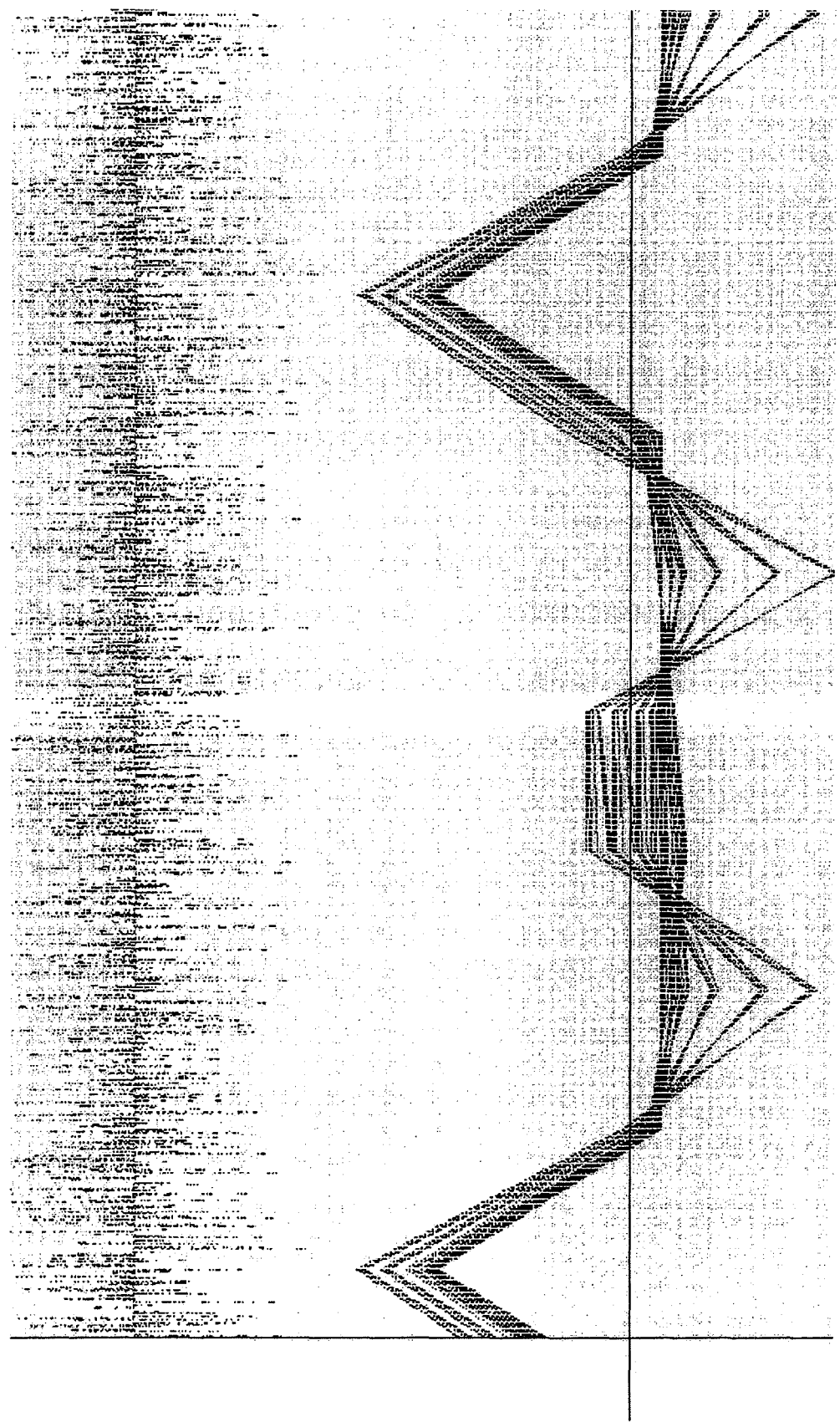
FIG. 19 illustrates a simulation waveform of a baseband signal in such a case that a localizing-purpose code sequence LC of "a" in FIG. 1 is an M-sequence having a code length "7", a coupling-purpose code sequence CC of "b-1" is a pulse train of which the code length is "1" and a polarity is "+", and a spreading-purpose code sequence SC of "c-1" is the M-sequence, having the code length "63", to which data "0" are mapped.

FIG. 19 illustrates a simulation waveform of a baseband signal in such a case that the localizing-purpose code sequence LC of "a" in FIG. 1 is the M-sequence having the code length "7", the coupling-purpose code sequence CC of "b-1" is a pulse train of which the code length is "1" and the polarity is "+", and the spreading-purpose code sequence Sc of "c-1" is the M-sequence, having the code length "63", to which the data "0" are mapped. The localization pulse detection method according to the present invention can be applied to a communication method capable of detecting the transmitted pulse train as the baseband signals, and hence a result of this simulation can be applied to baseband communications using the spread chip sequences to which the data are mapped, OFDM communications or Wavelet OFDM communications having the spread chip sequences with the data being mapped to the frequency domain or with the sub-channels being allocated with the spread chip sequences of the baseband signals in the time domain to which the data are mapped, mono-carrier communications or multi-carrier communications having the spread chip sequences of the baseband signals with the demodulation signals having the data, impulse train communications of the impulse train generated from the spread chip sequence to which the data are mapped, and so on.

In this example, the localizing-purpose code sequence corresponding to "a" in FIG. 1 is the M-sequence having the code length "7", the spreading-purpose code sequence with the code length being "63", which corresponds to "d-1" in FIG. 1, has the same polarity as the polarity of the LC chip, and the k-value of "c-1" in FIG. 1 is "1". The multiplicity of the multiplexing-spread chip sequence corresponding to "e" in FIG. 1 becomes "1" because of the CC code length being "1", and the signals are the same as the signals corresponding to "d-1" in FIG. 1. The signals corresponding to "a" and "b-1" in FIG. 6 are equal to the signals corresponding to "e" and "c-1" in FIG. 1. The reception signals are such a type of signals that the delay signal due to the multi-path, the interference noises and other narrowband and broadband noises are superposed on the transmission signals corresponding to "a" in FIG. 6. When these reception signals are de-spread by the SC corresponding to "b" in FIG. 6, the seven LC chips corresponding to "d" in FIG. 6 are demultiplexed, and the noises are superposed thereon. The code length of the CC is "1", and therefore the localization pulses, calculated from the CC, of the chips corresponding to "d" in FIG. 6, are equalized to the chips of the LC. These chips are localized by use of the LC, and the localization pulses are calculated.

Herein, the term "localization" connotes processing the signal by a matching filter or executing the process of the correlation function between this signal and the required code sequence. The present example can be also applied to the configuration in FIG. 2. In FIG. 2, the k-value is given by k=1, the LC is the M-sequence having the code length "7", the coupling-purpose code sequence CC of "b-1" is a pulse train of which the code length is "1" and the polarity is "+", and the spreading-purpose code sequence Sc of "c-1" is of the baseband signals defined as the M-sequence, having the code length "63", to which the data "0" are mapped. Further, the multiplexing-spread chip sequence given in "e" of FIG. 3 is, with the multiplicity becoming "1" because of the CC code length being "1", of the same signals as those in "d-1" of FIG. 2.

In FIG. 19, the axis of ordinate indicates the value of the correlation function, while the axis of abscissa indicates "x" in the case of the correlation function being notated by P(x), and in this example positions of the localization pulses on the axis of abscissa are seven points of "0" through "6" determined by the data. In FIG. 19, a waveform at an upper stage represents such a reception signal that interference noise power being varied from 0-fold up to 25,000-fold and in-band sine wave noise power being varied from 0-fold up to 5,000-fold are thus overlapped on the signal power.

As indicated by "e" in FIG. 6, according to the present invention, the data, which is expressed by the shift time of the SC and equalized to a time delay of the detected localization pulse, is represented by a distance from the axis of ordinate in FIG. 19. A triangular wave at a lower stage is the localization pulse calculated with respect to the LC by use of the de-spreading values of all the chips of the LC in a way that de-spreads the chips of the reception signals by multiplying the SC and the reception signals together while scanning from "0" up to "62" with the respective chips of the LC, and a peak of the triangular wave keeps a fixed distance from the axis of abscissa and is highly stable with respect to the variations of the interference nose power from 0-fold up to 25,000-fold and the variations of the in-band noise power from 0-fold up to 5,000-fold, whereby the data are properly transmitted. In this example, a first peak is defined as "0". A second peak appears because the correlation function related to the LC is a cyclic function of the cycle "7". Note that in a test for detecting a DS-SS signal under the same noise condition, erroneous detection occurs due to a DC component affected especially by the in-band noises.

Figure 16:
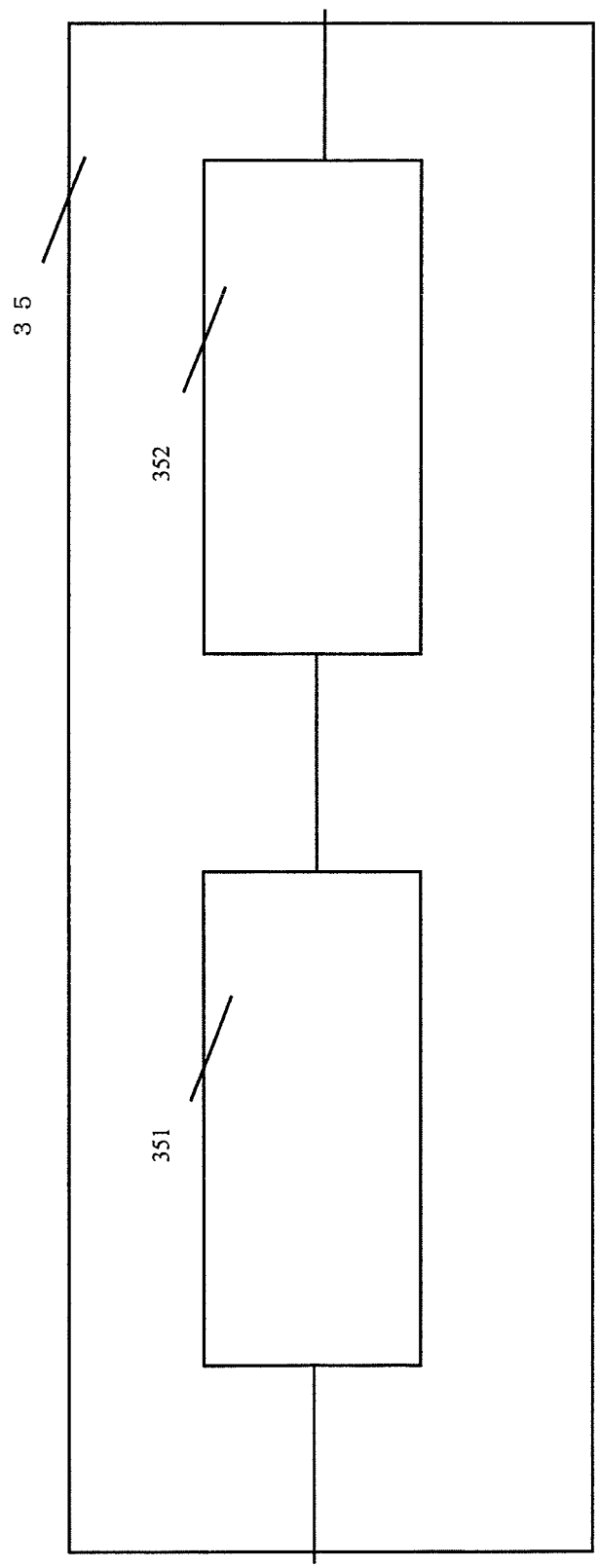
FIG. 16 is an explanatory diagram illustrating a decoding means in the reception apparatus of the communication system using the code sequences according to the embodiment of the present invention.

FIG. 16 illustrates a decoding means 35. A de-format transforming unit 351 calculates the data by de-format-transforming the data formats represented by the SC, the CC and the LC that are determined by the determining means 34, and subsequently a decode processing unit 352 decodes the source data by decoding the various processes performed by the input means 31.

Figure 17:
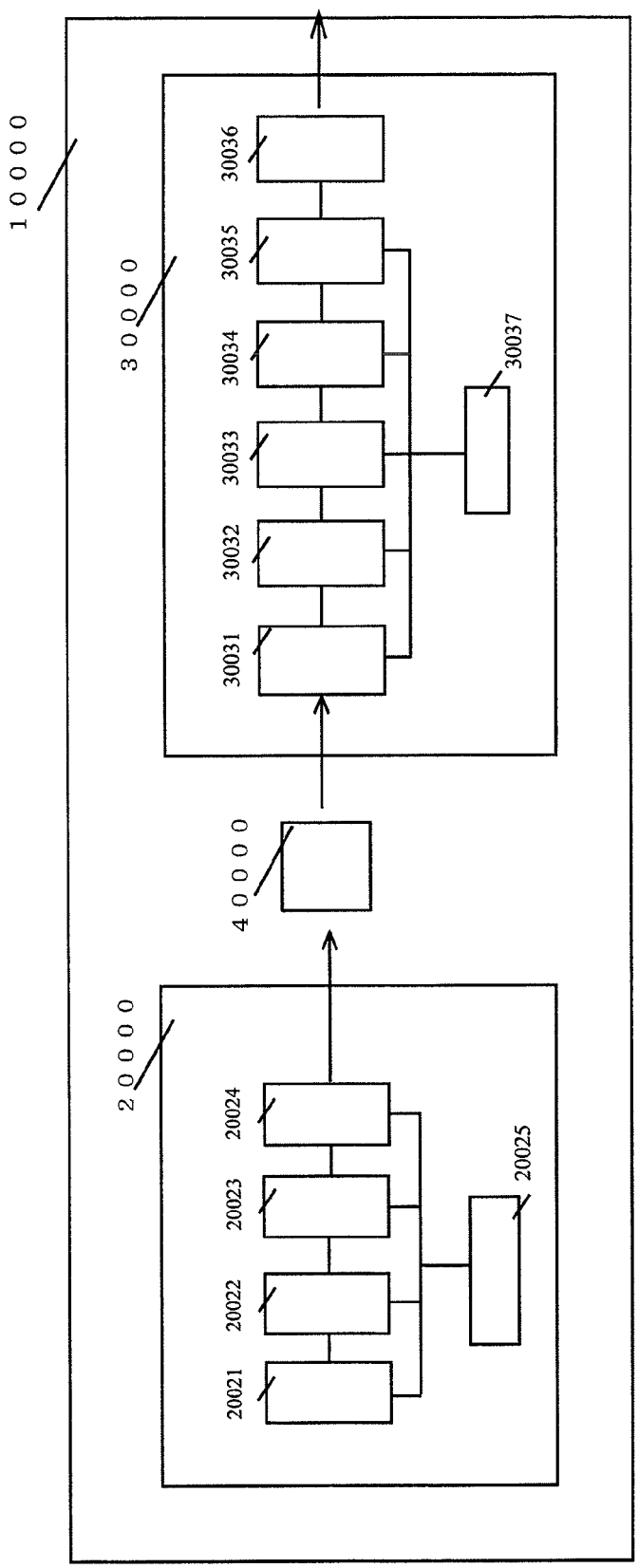
FIG. 17 is an explanatory diagram illustrating a measurement system using the code sequences according to the embodiment of the present invention.

FIG. 17 illustrates a measurement system 10000 using the code sequences according to the present invention. This system includes a measurement-purpose transmission apparatus 20000 and a measurement-purpose reception apparatus 30000, and measures a measurement target 40000. The measurement-purpose transmission apparatus 20000 includes a multiplexing-spread chip signal generating means 20021, a transforming means 20022, a transmission-purpose signal generating means 20023, a transmitting means 20024 and a control means 20025, in which the respective means are controlled in a manner that synchronizes with clocks of the control means 20025. On the other hand, the measurement-purpose reception apparatus 30000 includes a signal detecting means 30031, a transform signal processing means 30032, a detection enabling means 30033, a determining means 30034, an analyzing means 30035, a display/output means 30036 and a control means 30037, in which the respective means are controlled in a way that synchronizes with clocks of the control means 30037. In the measurement-purpose transmission apparatus 20000, the multiplexing-spread chip signal generating means 20021 generates the spread chip sequences by multiplying the chips of the LC, the chips of the CC and (the chips of) the SC together and generates the multiplexing-spread chip sequence by multiplexing the spread chip sequences with the multiplicity being equal to or larger than "1", and the transforming means 20022 transforms the multiplexing-spread chip sequence into the OFDM signals using the arrangement (sequence) in FIG. 3, the OFDM signals using the arrangement in FIG. 4, the Wavelet OFDM signals using the arrangement in FIG. 3 or the Wavelet OFDM signals using the arrangement in FIG. 4 and generates the transform signals by multiplexing these signals with the multiplicity being equal to or larger than "1". Note that the transform signals are not limited to those described above, and the multiplexing-spread chip sequence can be also dealt with as the transform signals. Subsequently, the transmission-purpose signal generating means 20023 generates the transmission-purpose signals, and the transmitting means 20024 generates the transmission signals in a required mode and transmits the generated signals to the measurement target 40000. The transmission signals include the multiplexing-spread chip sequence, the impulse train thereof, the transform signals generated by modulating the carrier waves and the hopping signals generated by modulating the hopping carrier waves by any one of the multiplexing-spread chip sequence and the impulse train, the multiplexed OFDM signals and the multiplexed Wavelet OFDM signals generated by multiplexing the OFDM signals and the Wavelet OFDM signals that are generated from the multiplexing-spread chip sequence and are orthogonal in the frequency domain, the transform signals generated by modulating the carrier waves with the signals being orthogonal in the frequency domain or the multiplexed signals thereof or the hopping signals generated by modulating the hopping carrier waves by these signals. The thus-structured transmission signals can be carried through energy mediums such as electromagnetic waves, the light, ultrasonic waves, magnetic waves, radioactive rays, electron beams and proton beams, however, types of the mediums are not limited to those described above.

The signals from the measurement target 40000 are detected by the signal detecting means 30031, equipped with a sensor, of the measurement-purpose reception apparatus 30000 and transmitted to the transform signal processing means 30032, and the transform signals thereof are DFT-transformed if being multiplexed OFDM signals and are DWT-transformed whereas if being the multiplexed Wavelet OFDM signals, and there is calculated the multiplexing-spread chip sequence per OFDM signal or the multiplexing-spread chip sequence per Wavelet OFDM signal by use of the expression (2) and the expression (3). Subsequently, the detection enabling means 30033 multiplies these multiplexing-spread chip sequences by the SC and thus enables the CC to be detected, and the determining means 30034 determines the maximum peak by detecting the peak of the localization pulses with respect to the CC or determines the maximum peak of the localization pulses with respect to the LC by detecting the peak of the localization pulses with respect to the CC and the LC. Then, information on the measurement target is acquired by measuring the amplitude of the maximum peak of the CC or the LC, the delay time, etc. In particular, the OFDM signals and the Wavelet OFDM signals generated based on the arrangement in FIG. 4 are suited to the use in the case of simultaneously acquiring the information on the target on a per subband basis or on a per time-subband basis.

Note that the respective means and the respective units described by use of FIGS. 7-17 may be realized respectively by hardware circuits, may also be realized on a PLD (Programmable Logic Device) such as an FPGA (Field-Programmable Gate Array), and may further be realized in such a way that a control program stored on the memory is loaded into and executed by a CPU (Central Processing Unit).

In an ultrasonic image measuring apparatus, a means 20024 is configured as a transmission-purpose ultrasonic element, a means 20031 is configured to include the same ultrasonic element as the means 20024 in FIG. 17, and the ultrasonic element is controlled by the transmission-purpose signals, thereby generating ultrasonic waves. On the other hand, reflected waves or derived waves are detected by controlling circuit timing in a way that exploits the same ultrasonic element as a sensor. An analyzing means 30035 acquires the image information, and the image is displayed on a display/output means 30036. Note that an aspect of the blood can be also displayed by detecting a Doppler shift. Other means operate in the same way as the operations described in the present paragraph.

Further, in a biometric ingredient measuring apparatus exploiting Raman Strokes scattering and Anti-Raman-Strokes scattering, the transmitting means 30024 is configured to include the fixed-wavelength coherent light source, the variable-wavelength coherent light source and/or the broadband coherent light source or a laser array, the light (laser beams) is emitted under the control of the transmission-purpose signals, and the target is irradiated with the emitted laser beams. Scattering produced from the target is detected by a signal detecting means 30031 configured to include a photodiode or a photodiode array.

Vectors of detected spectrums of the target are expressed by use of an intensity matrix of the ingredient of the target, and hence a concentration can be calculated therefrom.

Moreover, pieces of information of individual molecules can be measured by further narrowing down a focus of the beams.

The information of a type, a concentration, a state, etc of the measured ingredient is displayed in the form of an image, a graph or character information on the display/output means 30036. For example, if the target is the blood of the living body, a blood ingredient concentration containing a glucose concentration is measured.

Figure 20:
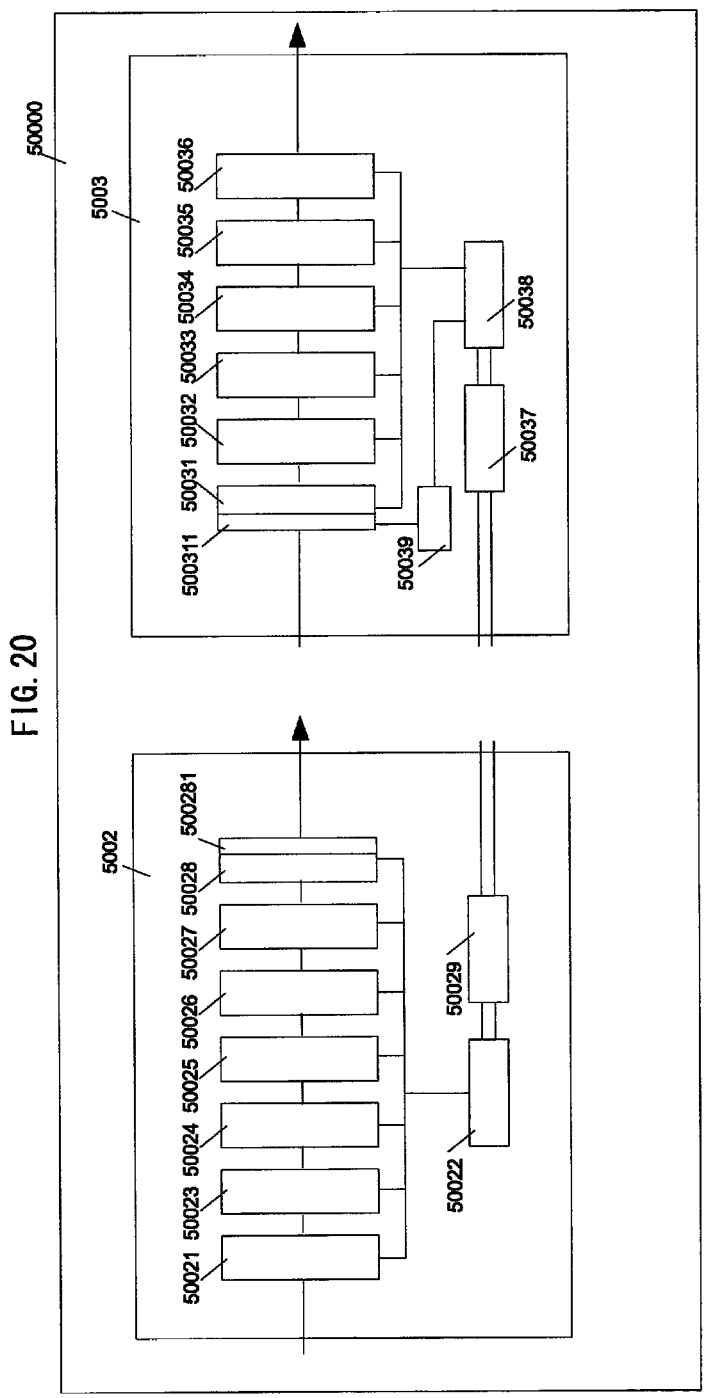
FIG. 20 illustrates a transmission apparatus and a reception apparatus.

The present invention is configured also as a communication system 50000 using a MIMO (Multiple-Input Multiple-Output) technology. FIG. 20 illustrates a transmission apparatus 5002 and a reception apparatus 5003. A process including error correction coding is applied to source data inputted to a coding means 50021. Subsequently, In a process 50023, a format conversion for mapping is carried out. A code sequence generating means 50024 generates the spreading-purpose code sequence, the coupling-purpose code sequence and the localizing-purpose code sequence. The data undergoing the format conversion in this process are mapped to the shift time, the polarity and/or the type of a required code sequence.

Subsequently, a multiplexing-spread signal generating means 50025 generates the spread chip sequence by multiplying the chips of the spreading-purpose code sequence, the chips of the coupling-purpose code sequence and the chips of the localizing-purpose code sequence together, thereby generating the multiplexing-spread chip sequence with a multiplicity being equal to or larger than "1" with respect to the chips of the coupling-purpose code sequence. In the present invention, the code sequence with the multiplicity being equal to "1" is defined as pulses of a unit amplitude, so that the multiplexing-spread chip sequence is binary if the code length of the coupling code sequence is "1".

A transforming means 50026 transforms single or plural multiplexing-spread chip sequences into OFDM signals or Wavelet OFDM signals, which are orthogonal in at least the frequency domain. It is to be noted that the transform signals can be configured to be the multiplexing-spread chip sequence.

Next, a transmission-purpose signal generating means 50027 generates the transmission-purpose signals in a way that attaches the preamble, the postamble, etc, however, elements to be attached are not limited to the preamble, the postamble, etc.

The transmission-purpose signals are inputted to a transmitting means 50028, then allocated to transmitting units 500281 each including an antenna array or a single antenna and transmitted via the same frequency band.

A control means 50022 generates clocks and controls the respective means. Further, an update means 50029 is used for communications with the reception side.

A reception apparatus 5003 is an apparatus of a switching system or a receiver. Single or plural transmission signals are received by the single or plural antenna array of a receiving unit 500311. The transmission signals passing through a matrix channel configured to include the transmitting units and the receiving units are converted into signal vectors at the receiving units, and hence the transmission-purpose signals are obtained by decoding the signal vectors.

Subsequently, an orthogonal signal processing means 50032 acquires the multiplexing-spread chip sequence in the time domain or the frequency domain from the transmission-purpose signals.

A detection-enabling means 50033 multiplies the multiplexing-spread chip sequence by the spreading-purpose code sequence. This process is a de-spreading process, in which noises beyond the band are removed.

Subsequently, a determining means 50034 detects the localization pulses of the coupling-purpose code sequence and/or the localization pulses of the localizing-purpose code sequence, and determines the parameters such as the shift time and the polarity of each code sequence and/or the type of the code sequence forming the spread chip sequence. Note that the processes about the parameters to which the data are not mapped, can be omitted.

A de-mapping means 50035 can obtain the data from theses determined parameters.

Next, a decoding means 50036 decodes the source data defined as the input data by executing an inverse error correction process of the data.

In the present invention, a multiplexing spread chip sequence formatted is assigned over the sub channels or in a sub channel along the time axis.

FIG. 21 illustrates an OCT system 60000 according to the present invention, and the OCT system 60000 is configured to include a transmission apparatus 62000 and a reception apparatus 63000. A spread signal; generating means 62021 generates the multiplexing-spread chip sequence. A light source unit 62022 includes single or plural fixed-wavelength coherent light sources, broadband coherent light sources or variable-wavelength coherent light sources, from which an array may also be configured. The transmission signals are generated by controlling this light source unit sequentially or in parallel in a manner that uses the multiplexing-spread chip sequence in a transmitting means 62023, and then transmitted to a target 64000.

Incidentally, such a configuration may also be taken that the OFDM is formed by the whole light source unit including the plurality of light sources having different wavelengths.

The transmission signals being reflected by or penetrating the target, when the target is irradiated with the transmission signals, are detected by a detecting means 63031, thereby acquiring the multiplexing-spread chip sequence in the time domain or the frequency domain.

A localization pulse detecting means 63032 multiplies the multiplexing-spread chip sequence by the spreading-purpose code sequence, and thereby detects the localization pulses of the coupling-purpose code sequence and/or the localization pulses of the localizing-purpose code sequence. Note that if a code length of the coupling-purpose code sequence is "1", the localization pulses of the localizing-purpose code sequence are detected without performing the localizing process.

Subsequently, a measuring means 63033 acquires items of data such as the amplitudes of the peaks, the delays, the polarities, etc of single or plural localization pulses, thereby acquiring the information containing the type, the concentration, the state, the Doppler velocity and the flow direction of the ingredient of the target. Note that the information on the target contains a type of an ingredient of the blood, a state of the ingredient, a concentration of the ingredient, a composition of a specified biometric tissue. Further, the OCT can be used for a variety of inspections in the industrial fields.

Single or plural pieces of acquired information are displayed in the faint of images, numerals, symbols, etc on a display means 63034.

INDUSTRIAL APPLICABILITY

The present invention is useful particularly as a data communication system and a measurement system using wireless mediums, which enable the efficient transmission on wired transmission channels such as a power line and a telephone line each requiring a high improvement rate of the SN ratio due to the large noises and on wireless transmission channels using wireless mediums such as the light, the radio waves, the magnetism and the ultrasonic waves.

What is claimed is:

1. A transmission signal generating/detecting method using code sequences, comprising:
generating a multiplexing-spread chip sequence with a multiplicity being equal to or larger than "1" by multiplexing single or a plurality of spread chip sequences each of which is formed in a way that multiplies a spreading-purpose code sequence which includes a sequence to which data are mapped and a chip of a coupling-purpose code sequence and a chip of a localizing-purpose code sequence together with respect to the chip or the chips of the coupling-purpose code sequence, generating transmission signals on the basis of transform signals generated by transforming at least a single multiplexing-spread chip sequence or a plurality of multiplexing-spread chip sequences and transmitting the generated transmission signals; and
acquiring the multiplexing-spread chip sequence in a time domain or a frequency domain from the transform signals by detecting the transmission signals, multiplying the acquired multiplexing-spread chip sequence by the spreading-purpose code sequence, and detecting at least one of the maximum localization pulse of the coupling-purpose code sequence and the maximum localization pulse of the localizing-purpose code sequence from the multiplied signals, wherein the transmission signal contains a preamble configured to include the code sequences having two or more periods, a delay wave superposed on the detected transmission signal is removed based on the preamble, and the multiplexing-spread chip sequence in the time domain or the frequency domain is acquired from the detection signal from which the delay wave is removed.

2. A transmission signal generating/detecting method using code sequences, comprising:

generating a multiplexing-spread chip sequence with a multiplicity being equal to or larger than "1" by multiplexing single or a plurality of spread chip sequences each of which is formed in a way that multiplies a spreading-purpose code sequence which includes a sequence to which data are mapped and a chip of a coupling-purpose code sequence and a chip of a localizing-purpose code sequence together with respect to the chip or the chips of the coupling-purpose code sequence, generating transmission signals on the basis of transform signals generated by transforming at least a single multiplexing-spread chip sequence or a plurality of multiplexing-spread chip sequences and transmitting the generated transmission signals; and acquiring the multiplexing-spread chip sequence in a time domain or a frequency domain from the transform signals by detecting the transmission signals, multiplying the acquired multiplexing-spread chip sequence by the spreading-purpose code sequence, and detecting at least one of the maximum localization pulse of the coupling-purpose code sequence and the maximum localization pulse of the localizing-purpose code sequence from the multiplied signals, the code sequence being configured to map the data to at least one of a shift time, an amplitude and a polarity, the method further comprising:

a first step of calculating addition signals by de-spreading the multiplexing-spread chip sequence with respect to all the shift times of the spreading-purpose code sequence corresponding to each chip of the localizing-purpose code sequence;

a second step of segmenting the addition signals into at least two groups;

a third step of calculating addition values of the respective groups;

a fourth step of calculating differences between the addition values;

a fifth step of calculating the localization pulses by using the differences;

a sixth step of detecting a maximum peak of the localization pulses and determining the group of the addition values giving the maximum peak;

a seventh step of calculating the addition values of each group by further segmenting the determined group of the addition values into groups;

an eighth step of calculating the localization pulses by using differences between the addition values of the groups;

a ninth step of detecting the maximum peak of the localization pulses and determining the group giving the maximum peak;

a tenth step of repeating processes in the seventh through ninth steps till reaching one tuple of addition signal in number per the localizing-purpose code sequence; and an eleventh step of determining the code sequence that is settled by the tuple of addition signal per chip of the localizing-purpose code sequence.

3. A transmission apparatus in a communication system using code sequences, the communication system comprising:

the transmission apparatus including:

encoding means to generate data applying a process including an error correction encoding to source data;

format converting means to convert the data into a predetermined format for mapping;

code sequence generating means to generate single or a plurality of spreading-purpose code sequences, a coupling-purpose code sequence and a localizing-purpose code sequence, the data being converted into the format and mapped to at least one of an amplitude, shift time, a polarity, a type of at least any one of these sequences;

multiplexing-spread signal generating means to generate a multiplexing-spread chip sequence with a multiplicity being equal to or larger than "1" by multiplexing single or a plurality of spread chip sequences each of which is formed in a way that multiplies a spreading-purpose code sequence, a chip of a coupling-purpose code sequence and a chip of a localizing-purpose code sequence together with respect to the chips of the coupling-purpose code sequence;

transforming means to generate orthogonal signals being orthogonal in at least one of the time domain and the frequency domain by transforming a single multiplexing-spread chip sequence or a plurality of multiplexing-spread chip sequences;

transmission-purpose signal generating means to generate transmission-purpose signals for generating the transmission signals by use of at least the orthogonal signals and a preamble or a postamble; and transmitting means to include a single or plural transmission units using the same band, to generate a single or plural transmission signals from the transmission-purpose signals and to transmit the generated signal(s) from the transmission unit(s); and a reception apparatus including:

receiving means to include single or plural reception units and to detect transmission-purpose signals in a way that receives a single or plural transmission signals by the reception unit(s);

orthogonal signal processing means to acquire the multiplexing-spread chip sequence in a time domain or a frequency domain from the orthogonal signals detected from the transmission-purpose signals;

detection enabling means to multiply the acquired multiplexing-spread chip sequence by the spreading-purpose code sequence;

determining means to determine at least one of the shift time, the polarity, the amplitude and the type of the code sequence forming the spread chip sequence by detecting at least one of localization pulses of the coupling-purpose code sequence and localization pulses of the localizing-purpose code sequence from an output of the detection enabling means;

de-mapping means to de-map the data from the code sequence of which at least one of the shift time, the amplitude, the polarity and the type are determined; and decoding means to decode source data by applying a required process including an inverse error correction coding process to the data.

4. A reception apparatus in a communication system using code sequences, the communication system comprising:

a transmission apparatus including:

encoding means to generate data applying a process including an error correction encoding to source data;

format converting means to convert the data into a predetermined format for mapping;

code sequence generating means to generate single or plural spreading-purpose code sequences, a coupling-purpose code sequence and a localizing-purpose code sequence, the data being converted into the format and mapped to at least one of an amplitude, shift time, a polarity, a type of at least any one of these sequences;

multiplexing-spread signal generating means to generate a multiplexing-spread chip sequence with a multiplicity being equal to or larger than "1" by multiplexing single or a plurality of spread chip sequences each of which is formed in a way that multiplies a spreading-purpose code sequence, a chip of a coupling-purpose code sequence and a chip of a localizing-purpose code sequence together with respect to the chips of the coupling-purpose code sequence;

transforming means to generate orthogonal signals being orthogonal in at least one of the time domain and the frequency domain by transforming a single multiplexing-spread chip sequence or a plurality of multiplexing-spread chip sequences;

transmission-purpose signal generating means to generate transmission-purpose signals for generating the transmission signals by use of at least the orthogonal signals and a preamble or a postamble; and transmitting means to include a single or plural transmission units using the same band, to generate a single or plural transmission signals from the transmission-purpose signals and to transmit the generated signal(s) from the transmission unit(s); and the reception apparatus including:

receiving means to include single or plural reception units and to detect transmission-purpose signals in a way that receives a single or plural transmission signals by the reception unit(s);

orthogonal signal processing means to acquire the multiplexing-spread chip sequence in a time domain or a frequency domain from the orthogonal signals detected from the transmission-purpose signals;

detection enabling means to multiply the acquired multiplexing-spread chip sequence by the spreading-purpose code sequence;

determining means to determine at least one of the shift time, the polarity, the amplitude and the type of the code sequence forming the spread chip sequence by detecting at least one of localization pulses of the coupling-purpose code sequence and localization pulses of the localizing-purpose code sequence from an output of the detection enabling means;

de-mapping means to de-map the data from the code sequence of which at least one of the shift time, the amplitude, the polarity and the type are determined; and decoding means to decode source data by applying a required process including an inverse error correction coding process to the data.

* * * * *